United States Patent
Forzani et al.

(10) Patent No.: US 11,566,801 B2
(45) Date of Patent: Jan. 31, 2023

(54) METHOD AND SYSTEM FOR ASSESSING METABOLIC RATE AND MAINTAINING INDOOR AIR QUALITY AND EFFICIENT VENTILATION ENERGY USE WITH PASSIVE ENVIRONMENTAL SENSORS

(71) Applicant: Arizona Board of Regents on behalf of Arizona State University, Scottsdale, AZ (US)

(72) Inventors: Erica Forzani, Mesa, AZ (US); Nongjian Tao; Francis Tsow, San Jose, CA (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 147 days.

(21) Appl. No.: 16/959,646

(22) PCT Filed: Jan. 2, 2019

(86) PCT No.: PCT/US2019/012093
§ 371 (c)(1),
(2) Date: Jul. 1, 2020

(87) PCT Pub. No.: WO2019/136097
PCT Pub. Date: Jul. 11, 2019

(65) Prior Publication Data
US 2021/0048206 A1 Feb. 18, 2021

Related U.S. Application Data

(60) Provisional application No. 62/612,961, filed on Jan. 2, 2018.

(51) Int. Cl.
*F24F 11/00* (2018.01)
*F24F 11/63* (2018.01)
(Continued)

(52) U.S. Cl.
CPC ......... *F24F 11/0001* (2013.01); *F24F 11/63* (2018.01); *F24F 11/77* (2018.01);
(Continued)

(58) Field of Classification Search
CPC ........ F24F 11/0001; F24F 11/63; F24F 11/77; F24F 2110/10; F24F 2110/70;
(Continued)

(56) References Cited

U.S. PATENT DOCUMENTS 5,872,721 A * 2/1999 Huston ................... A23B 7/148
702/24
6,581,595 B1 * 6/2003 Murdock ............ A61M 16/024
128/204.23

(Continued)

FOREIGN PATENT DOCUMENTS

FR 2945335 A1 * 11/2010 .......... F24F 11/0001
WO 2017006204 A1 1/2017

OTHER PUBLICATIONS

Allen et al. "Associations of Cognitive Function Scores with Carbon Dioxide, Ventilation, and Volatile Organic Compound Exposures in Office Workers: A Controlled Exposure Study of Green and Conventional Office Environments" Environmental Health Perspectives, vol. 124, No. 6, 2016, pp. 805-812.
(Continued)

*Primary Examiner* — Thomas C Lee
*Assistant Examiner* — Anzuman Sharmin
(74) *Attorney, Agent, or Firm* — Withrow & Terranova, P.L.L.C.; Vincent K. Gustafson

(57) ABSTRACT

An integrated method for assessing metabolic rate and maintaining indoor air quality and efficient ventilation energy use. A physical sensor assesses room occupancy. An actuated ventilation system is set to a constant $CO_2$ level in a predetermined healthy range, where the actuated ventila-
(Continued)

tion system includes a $CO_2$ sensor. The actuated ventilation system sets a first air ventilation rate and the sensor measures a first $CO_2$ level. The system determines whether $CO_2$ level is in a healthy range, if not then the $CO_2$ level is adjusted by setting a subsequent air ventilation rate. A subsequent $CO_2$ level is measured. If the $CO_2$ level is determined to meet a predetermined healthy range, then an assessment of change of air ventilation rate ($\Delta$ ACH) is determined. The determination of air change rate can be further augmented by a physical pressure based measurement. The overall metabolic rate is generated.

19 Claims, 25 Drawing Sheets

(51) Int. Cl.
```
F24F 11/77      (2018.01)
F24F 110/10     (2018.01)
F24F 110/70     (2018.01)
F24F 120/10     (2018.01)
F24F 11/30      (2018.01)
F24F 11/74      (2018.01)
```
(52) U.S. Cl.
CPC ....... *F24F 2110/10* (2018.01); *F24F 2110/70* (2018.01); *F24F 2120/10* (2018.01)
(58) Field of Classification Search
CPC ........ F24F 2120/10; F24F 11/30; F24F 11/74; Y02B 30/70
See application file for complete search history.

(56) References Cited

U.S. PATENT DOCUMENTS

| | | | |
|---|---|---|---|
| 9,957,052 B2* | 5/2018 | Fox | B64D 13/06 |
| 2002/0035927 A1* | 3/2002 | Kutt | F24F 11/30 96/111 |
| 2006/0199518 A1* | 9/2006 | Spiegel | F24F 3/16 454/238 |
| 2007/0082601 A1* | 4/2007 | Desrochers | F24F 3/044 454/239 |
| 2007/0149109 A1 | 6/2007 | Gu et al. | |
| 2012/0095684 A1* | 4/2012 | Chan | G01N 33/0032 702/2 |
| 2012/0135527 A1* | 5/2012 | Bangera | D03D 15/283 436/3 |
| 2016/0047891 A1* | 2/2016 | Campbell | G01S 7/4865 702/150 |
| 2017/0113512 A1* | 4/2017 | Park | G06V 40/18 |
| 2017/0356670 A1 | 12/2017 | Zhang et al. | |
| 2021/0215377 A1* | 7/2021 | Kitagawa | F24F 11/0001 |

OTHER PUBLICATIONS

Apte et al. "Associations Between Indoor $CO_2$ Concentrations and Sick Building Syndrome Symptoms in U.S. Office Buildings: An Analysis of the 1994-1996 BASE Study Data" Indoor Air, vol. 10, No. 4, 2000, pp. 246-257.
Atkinson et al. "Natural Ventilation for Infection Control in Health-Care Settings" WHO Publication/Guidelines, 2009, 133 pages.
Bouhamra et al. "Predicted and Measured Air Exchange Rates" Ashrae Journal—American Society of Heating Refrigerating and Air-Conditioning Engineers, vol. 40, 1998, pp. 42-45.
Deng et al. "Comparison of Resting Metabolic Rates Between Predictive Equations and Portable Indirect Calorimeter" The Obesity Society, 2017.
Dinh et al. "A review on non-dispersive infrared gas sensors: Improvement of sensor detection limit and interference correction" Sensors and Actuators B: Chemical, vol. 231, 2016, pp. 529-538.
E. R., "Measuring Air Changes per Hour with Carbon Dioxide. Imperial College London:London, U.K.," ed.
Esparza et al. "Daily energy expenditure in Mexican and USA Pima Indians: low physical activity as a possible cause of obesity" International Journal of Obesity, vol. 24, No. 1, 2000, pp. 55-59.
GE Sensing, "Telaire 7001 $CO_2$ and Temperature Monitor User Instructions" T62292-007, Oct. 2006, 5 pages.
Gladyszewska-Fiedoruk, "Concentrations of carbon dioxide in the cabin of a small passenger car" Transportation Research Part D, vol. 16, 2011, pp. 327-331.
Godish, "Sick Buildings: Definition, Diagnosis, and Mitigation" CRC Press, 1st Edition, 1995, 417 pages.
Jones "Resting Metabolic Rate: A Critical, Primary Care Screening Test" Medscape General Medicine, vol. 8, No. 2, p. 76.
Maddalena et al. "Effects of ventilation rate per person and per floor area on perceived air quality, sick building syndrome symptoms, and decision-making" Indoor Air, vol. 25, 2015, pp. 362-370.
Mcardle et al. "Exercise Physiology: Nutrition,Energy, and Human Performance" Lippincott Williams & Wilkins, Seventh Edition, 2010, 1106 pages.
Mifflin et al. "A new predictive equation for resting energy expenditure in healthy individuals" American Journal of Clinical Nutrition, vol. 51, No. 2, 1990, pp. 241-247.
Neuhouser et al. "Use of Recovery Biomarkers to Calibrate Nutrient Consumption Self-Reports in the Women's Health Initiative" American Journal of Epidemiology, vol. 167, No. 10, 2008, pp. 1247-1259.
Nieman et al. "A new handheld device for measuring resting metabolic rate and oxygen consumption" Journal of the American Dietetic Association, vol. 103, No. 5, 2003, pp. 588-593.
Persily et al. "Carbon dioxide generation rates for building occupants" Indoor Air, vol. 27, Supplement 1, 2017, pp. 868-879.
Pitarma et al. "Monitoring Indoor Air Quality for Enhanced Occupational Health" Journal of Medical Systems, vol. 41, No. 2, 2017, 8 pages.
Satish et al. "Is $CO_2$ an Indoor Pollutant? Direct Effects of Low-to-Moderate $CO_2$ Concentrations on Human Decision-Making Performance" Environmental Health Perspectives, vol. 120, No. 12, 2012, pp. 1671-1677.
Shao et al. "Noncontact Monitoring Breathing Pattern, Exhalation Flow Rate and Pulse Transit Time" IEEE Transactions on Biomedical Engineering, vol. 61, No. 11, 2014, pp. 2760-2767.
Shao et al. "Noncontact Monitoring of Blood Oxygen Saturation Using Camera and Dual-Wavelength Imaging System" IEEE Transactions on Biomedical Engineering, vol. 63, No. 6, 2016, pp. 1091-1098.
Sherman "Tracer-Gas Techniques For Measuring Ventilation in a Single Zone" Building and Environment, vol. 25, No. 4, 1990, pp. 365-374.
Shrestha et al. "Product Testing Report Wall-Mounted CO2 Humidity Transmitters," Iowa State University: Ankeny, IA, 2008.
Speakman et al. "Physical activity and resting metabolic rate" Proceedings of the Nutrition Society, vol. 62, No. 3, 2003, pp. 621-634.
Stapel et al. "Ventilator-derived carbon dioxide production to assess energy expenditure in critically ill patients: proof of concept" Critical Care, vol. 19, No. 1, 2015, 10 pages.
Weir "New Methods For Calculating Metabolic Rate With Special Reference To Protein Metabolism" Journal of Physiology, vol. 109, Nos. 1-2, 1949, 9 pages.
Weissler "CO2 buildup in vehicle cabins becoming a safety issue" SAE International, 2017, 3 pages, https://www.sae.org/news/2017/04/co2-buildup-in-vehicle-cabins-becoming-a-safety-issue.
Xian et al. "Personalized Indirect Calorimeter for Energy Expenditure (EE) Measurement" Global Journal of Obesity, Diabetes and Metabolic Syndrome, vol. 2, No. 1, 2015, 5 pages.
Zhang et al. "Effects of exposure to carbon dioxide and bioeffluents on perceived air quality, self-assessed acute health symptoms, and cognitive performance" Indoor Air, vol. 27, No. 1, 2017, 18 pages.
International Search Report and Written Opinion for International Application No. PCT/US2019/012093, dated Apr. 9, 2019, 8 pages.

(56) References Cited

OTHER PUBLICATIONS

International Preliminary Report on Patentability for International Application No. PCT/US2019/012093, dated Jul. 7, 2020, 7 pages.

* cited by examiner

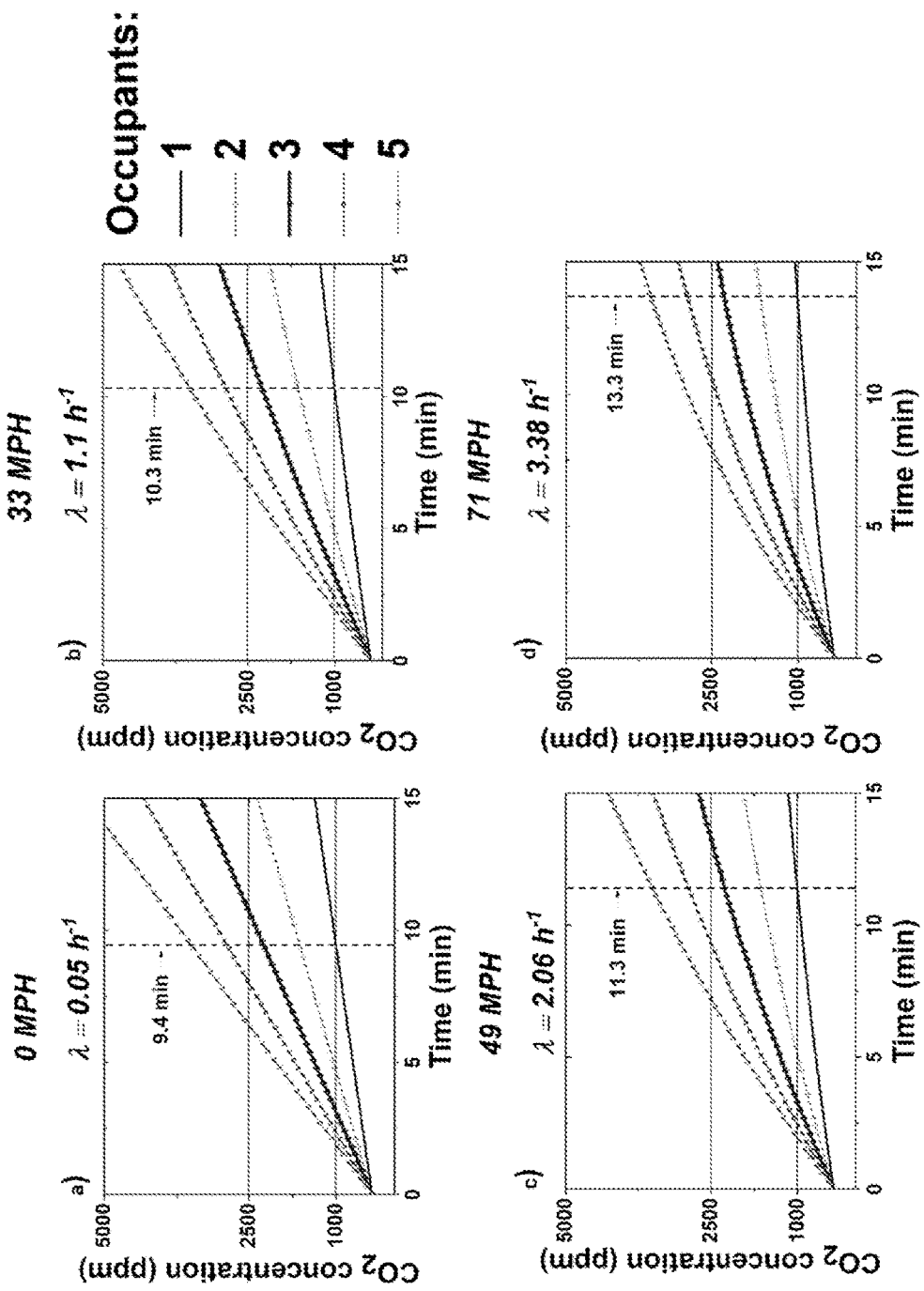

METHOD AND SYSTEM FOR ASSESSING METABOLIC RATE AND MAINTAINING INDOOR AIR QUALITY AND EFFICIENT VENTILATION ENERGY USE WITH PASSIVE ENVIRONMENTAL SENSORS

Cross-Reference to Related Applications

This application is a 35 U.S.C. § 371 national phase filing of International Application No. PCT/US2019/012093 filed Jan. 2, 2019, which claims priority to U.S. Provisional Patent Application No. 62/612,961 filed Jan. 2, 2018, wherein the entire contents of the foregoing applications are hereby incorporated by reference herein.

TECHNICAL FIELD

The present invention relates to a method and system for assessing metabolic rate and maintaining indoor air quality and efficient ventilation energy use. More particularly, the method and system utilizes passive sensors for monitoring indoor air quality and managing air change rate in a car cabin or small room.

BACKGROUND

Metabolic activity, also known as energy expenditure, can have a significant effect on a person's mental and physical health and, as such, the ability to measure metabolic rate is a valuable tool when it is used to assess a person's daily caloric needs [1]. The Resting Metabolic Rate (RMR) and its associate estimation of total energy expenditure are useful metrics for determining a person's metabolic rate, the measurement and analysis of which is the only way for professionals to properly estimate caloric needs of an individual and to suggest diet and exercise plans that best fit a person's wellness and weight goals [1, 2].

Although epidemiological equations can be used for the calculation of RMR [3], an individual's personal value of RMR is unpredictable and should be directly measured for a more accurate assessment of metabolic activity [4a,b]. The RMR value depends on many physiological parameters and can change depending on a person's stress, diet, and exercise tendencies [2]. Traditional methods of assessing metabolic rate include the use of metabolic charts [1], desk-top instruments [1], hand-held devices [5], and mobile trackers [6]. These devices are based on the indirect calorimetry method, which assesses the person's oxygen consumption rate ($VO_2$) only, or in addition to the carbon dioxide production rate ($VCO_2$). However, assessing metabolic rate (energy expenditure) under free living conditions without the burden of actively performing a measurement with an instrument is ideal because it requires little to no effort or time commitment on the part of the individual. Furthermore, free-living metabolic rate (energy expenditure) may offer not only information about the resting state (RMR), but also the metabolic rate at different activities, times of the day, periods of the year, and life circumstances, which makes possible the assessment of Total Energy Expenditure, the key parameter needed for assessment of the individual's true energy expenditure. In this regard, the only Gold Standard for assessment of Total Energy Expenditure (TEE) is the Doubly Labeled Water Method (DLWM) [7]. This method uses the decay of isotopes in urine, and determines carbon dioxide production rate to apply the calculation of metabolic rate (energy expenditure), assuming a respiratory quotient of 0.85 [7]. Although the subject is able to live freely during the testing period of 7-10 days, the method requires urine sample collection at day 1 and at day 7 or 10. As a result, it is only able to provide a single integrative metabolic rate value of 7 to 10 days of life without discrimination of resting, or higher resolution metabolic rate patterns [8]. Furthermore, the method requires isotope analysis with intensive maintenance, and it is laborious, time consuming and costly (~$1,000 isotope dose per test).

Other examples of total energy expenditure assessment include calorie/activity trackers (e.g., wrist watches). These devices are based on physical sensors that fail to accurately represent a person's metabolic activity because do not perform indirect calorimetry or isotope-based measures. Instead they use equations based on accelerometer or heart rate parameters and calculated resting metabolic rate. Even commonly used equations calculating metabolic rate can differ by as much as 900 kcal/day [4]. Therefore, calorie/activity trackers are not necessarily an accurate approach to monitor total energy expenditure or metabolic rate.

In order to mitigate the problems described above, more recently a method providing metabolic rate from carbon dioxide production rate generated by individuals under free-living conditions was proposed [4b]. However, the system is based on build-up carbon dioxide levels that can be poisoning for the individual, and detrimental to health.

Presently known systems and methods do not provide feasible techniques for passively assessing metabolic rate from carbon dioxide production rates generated by individual(s) in different confined environments without placing risk on individual's poisoning from their own carbon dioxide production. To overcome the drawbacks of the above-described known methods and systems, a passive system for monitoring metabolic rate under free living conditions for single and multiple individuals considering the exposure of the individual to good indoor air quality is needed. In addition, the system must offer the possibility to provide an efficient ventilation energy use. Such a system is disclosed herein.

BRIEF SUMMARY OF THE DISCLOSURE

This summary is provided to introduce, in a simplified form, a selection of concepts that are further described below in the Detailed Description. This summary is not intended to identify key features of the claimed subject matter, nor is it intended to be used as an aid in determining the scope of the claimed subject matter.

An integrated method for assessing overall metabolic rate (also known as total energy expenditure) while maintaining good indoor air quality and relatively efficient ventilation energy use is provided. A physical sensor assesses room occupancy. An output for assessment of overall metabolic rate for multiple users or an individual assessment of an individual's metabolic rate for a single user is generated. An actuated ventilation system is set to a constant $CO_2$ level in a predetermined healthy range, where the actuated ventilation system includes at least one $CO_2$ sensor, and the set level does not produce excessive energy consumption. The actuated ventilation system sets a first air ventilation rate and the sensor measures a first $CO_2$ level. The system determines whether the $CO_2$ level is in the healthy range (fixed within 600-1000 ppm), if not then the $CO_2$ level is adjusted, and a subsequent air ventilation rate is set. The ventilation rate can be model driven or as measured with a physical system, removing the need for user periodic calibration. If the $CO_2$ level is determined to meet the predetermined healthy range, then an assessment of metabolic rate is provided as outcome of the change of air ventilation rate (ΔACH). The system will set the $CO_2$ level a healthy range within 600-1000 ppm with a narrow range and at a convenient set point to optimize ventilation energy use.

BRIEF DESCRIPTION OF THE DRAWINGS

While the novel features of certain embodiments of the invention are set forth with particularity in the appended claims, the invention, both as to organization and content, will be better understood and appreciated, along with other objects and features thereof, from the following detailed description taken in conjunction with the drawings, in which:

FIG. 19A-FIG. 19D show examples of $CO_2$ concentration at different vehicle speeds and for different numbers of vehicle occupants.

Figure 1:
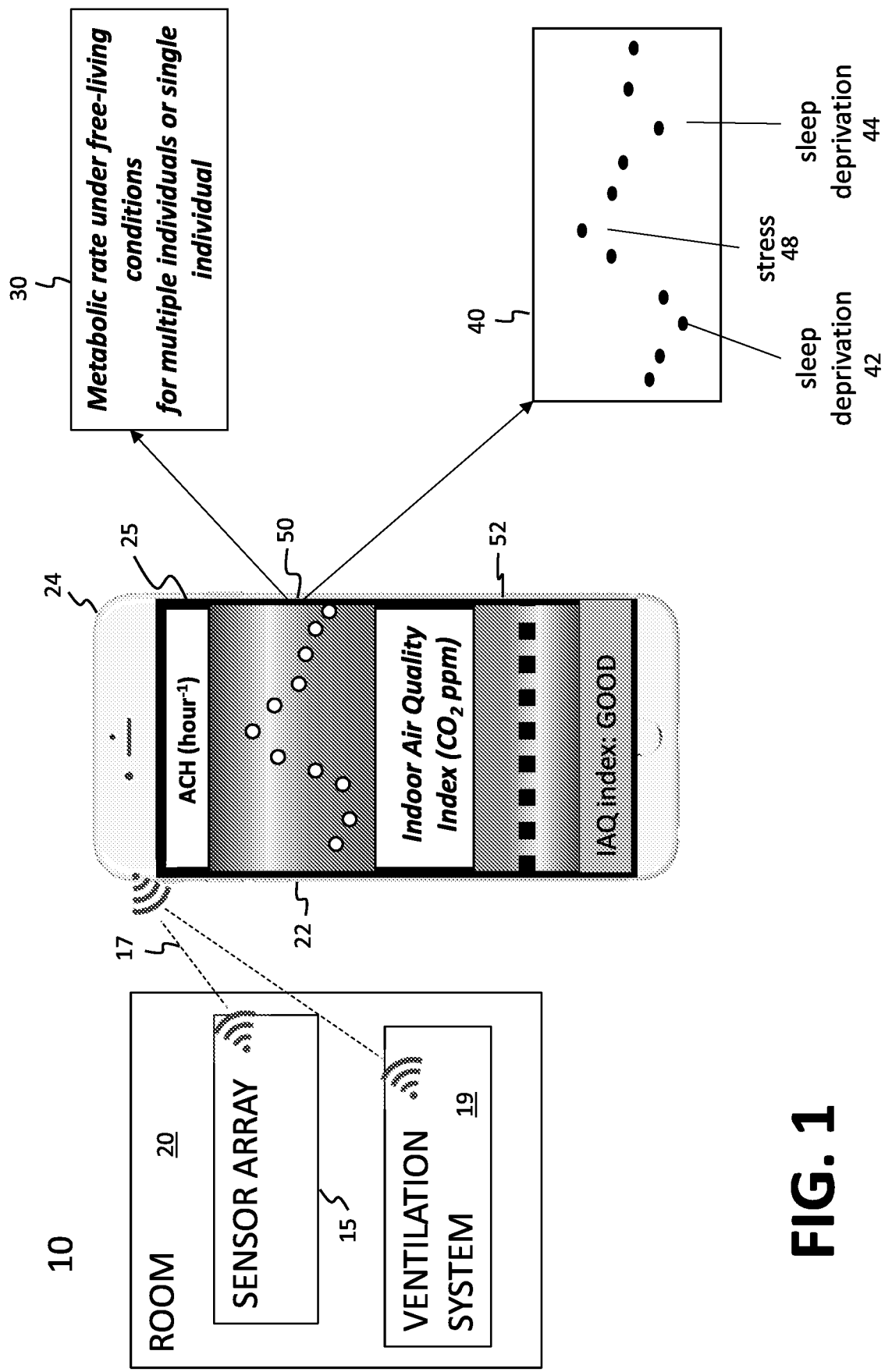
FIG. 1 schematically illustrates a system for assessing indoor air quality and energy efficiency and biometrics assessment under free-living conditions.

In the drawings, identical reference numbers identify similar elements or components. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

The following disclosure describes a method and apparatus for assessing metabolic rate and indoor air quality. Several features of methods and systems in accordance with example embodiments are set forth and described in the figures. It will be appreciated that methods and systems in accordance with other example embodiments can include additional procedures or features different than those shown in the figures. Example embodiments are described herein with respect to a method and apparatus using passive sensors for monitoring carbon dioxide ($CO_2$) and setting an air change rate (ACH) in a car cabin or small room. However, it will be understood that these examples are for the purpose of illustrating the principles, and that the invention is not so limited.

Unless the context requires otherwise, throughout the specification and claims which follow, the word "comprise" and variations thereof, such as, "comprises" and "comprising" are to be construed in an open, inclusive sense that is as "including, but not limited to."

The term air change rate and air ventilation rate as well as the symbol ACH are used with the same meaning, and means the number of times the volume of a room or car cabin is exchanged per unit of time.

Reference throughout this specification to "one example," "an example embodiment," "one embodiment," "an embodiment" or combinations and/or variations of these terms means that a particular feature, structure or characteristic described in connection with the embodiment is included in at least one embodiment of the present disclosure. Thus, the appearances of the phrases "in one example" or "in an example" in various places throughout this specification are not necessarily all referring to the same example embodiment. Furthermore, the particular features, structures, or characteristics may be combined in any suitable manner in one or more embodiments.

Definitions

Generally, as used herein, the following terms have the following meanings when used within the context of air quality assessment:

The articles "a" or "an" and the phrase "at least one" as used herein refers to one or more.

"The Auto41 system" as used herein refers to a system developed by the inventors that passively detects and tracks metabolic rate via indirect calorimetry under free-living conditions in confined environments that includes an array of sensors and an intelligent algorithm embedded in a mobile device as a software application (app).

Bluetooth® technology, as used herein means a commercially available low-power wireless connectivity technology used to stream audio, transfer data and broadcast information between devices.

As used herein, "plurality" is understood to mean more than one. For example, a plurality refers to at least two, three, four, five, ten, 25, 50, 75, 100, 1,000, 10,000 or more.

As used in this specification, the terms "computer", "processor" and "computer processor" encompass a personal computer, a tablet computer, a smart phone, a microcontroller, a microprocessor, a field programmable object array (FPOA), a digital signal processor (DSP), an application-specific integrated circuit (ASIC), a field programmable gate array (FPGA), a programmable logic array (PLA), or any other digital processing engine, device or equivalent capable of executing software code including related memory devices, transmission devices, pointing devices, input/output devices, displays and equivalents.

"Obtaining" is understood herein as manufacturing, purchasing, or otherwise coming into possession of.

Example Embodiments

In contrast to known methods described in the background section above, here presented for the first time is a method and system for accurate assessment of metabolic rate under free living conditions, using an inexpensive sensor system that passively assesses the metabolic rate in a minimum period of 20 min.-90 min. in conjunction with the simultaneous assessment of indoor air quality (IAQ) so that the indoor air quality can be maintained. In one example, the system includes sensors of carbon dioxide, temperature, humidity, pressure, noise and occupancy, as well as a mathematical model that determines individual's metabolic rate from produced carbon dioxide ($VCO_2$) rate.

The system's sensors could be deployed in numerous places using ventilation systems, to monitor and adjust indoor air quality (IAQ) to maintain good IAQ as needed. In this regard, $CO_2$ concentrations and other parameters known to the field, including but not limited to equivalent carbon dioxide concentration, can be used as surrogate of IAQ. The primary source of $CO_2$ concentrations within non-industrialized settings—and in the absence of combustion sources—is from the produced carbon dioxide ($VCO_2$) rate of a room's occupants. Today, a majority of people spend approximately 90% of their day indoors, and, as a result, are at risk of developing the signs and symptoms associated with Sick Building Syndrome (SBS) [11a]. Furthermore, recent publications have reported direct effects of low-to-moderate $CO_2$ concentrations on human decision-making performance [11 b-d]. It is also probable that human physical performance may be affected due to exposure to unhealthy $CO_2$ concentrations. The optimization of existing ventilation systems is necessary to minimize SBS symptoms and degradation on human performance. Current monitoring methods for ventilation systems offer intermittent sampling of parameters for IAQ, however, the ability to confirm the physical presence of people in a setting and to determine the number of occupants in confined environments allows for unique assessment of the individual's biometrics, more specifically a metabolic rate.

One motivation inspiring the presently disclosed system is the need for detection and quantification of $CO_2$ in indoor conditions generated by human metabolic rates. It is known that $CO_2$ is already in the atmosphere in concentrations ranging from approximately 350 to 450 ppm [11a, 12]. Current atmospheric levels of $CO_2$ pose little to no health risks. The US Occupational Safety and Health Administration has set a 5000-ppm Permissible Exposure Limit as an 8-hour Total Weight Average (TWA), and a 30,000-ppm Short Term Exposure Limit as a 10-minute TWA for $CO_2$ [13]. In non-industrialized indoor settings, such as an office, classroom, and vehicle; $CO_2$ concentrations can range between 350 and 4500 ppm and higher [11, 12]. Studies have shown that indoor occupants have reported symptoms of discomfort at indoor $CO_2$ concentrations that exceed 600 ppm, when spending a substantial amount of time within an indoor setting [11], which is below the established exposure limits [14]. The discomfort affecting these occupants can be serious; those in $CO_2$ rich environments exhibit upper and lower respiratory tract complications such as dysphonia, dry cough, and asthma. Nervous system complications including headaches and difficulty concentrating are also signs of $CO_2$ overexposure in addition to skin and eye irritation [15].

Referring now to FIG. 1, a system that passively detects and tracks metabolic rate via indirect calorimetry under free-living conditions in confined environments is schematically shown. A system for providing metabolic rate readings under free-living conditions 10, while maintaining indoor air quality and energy efficiency includes a sensor array 15 installed in a small room or car cabin 20, and a processor including a user interface 22 viewed, for example, from an application 25 (app) in a processor 24 as installed in a mobile device or display, such as a "smart phone," computer, tablet computer, LCD display or the like. The fixed sensor array 15 includes a console module and a seat module as described in more detail below with respect to FIG. 2. The user interface 22 contains a software application that acquires the data, and uses an intelligent algorithm to actuate a ventilation system, and determine the changes in Air change rate ($\Delta$ACH) so that a good indoor air quality is achieved by maintaining constant and healthy levels of $CO_2$ with an energy efficient cost. The system determines variability of ACH and provides metabolic rate information of the subject. 30, which can be related to lifestyle, environmental factors, and can provide information related to weight management based on other biometrics and environmental readings obtained from the individual. Communication between the sensor array 15 and the user interface 22 may be wired or implemented using known wireless technologies 17, for example Bluetooth® technology.

In response to information received from the sensor array 15, the application 25 provides output readings of metabolic rate for a single individual or multiple individuals. The output readings are extracted from the air change rate changes and levels of $CO_2$ and are graphically illustrated in plot 40 showing levels of metabolic rate versus time. Low levels of metabolic rate 42, 44 may correspond, for example to sleep deprivation in a subject or subjects. High levels of metabolic rate 48, may correspond to for example, stress levels in the subject(s).

In one example, user interface 22 may include a display including an upper display 50 showing a graphical representation of ACH/hour and a lower display 52 indicating indoor air quality index based on $CO_2$ levels in parts per million. One of the displays may include color-coded stratified regions in order to give a viewer an indication of whether readings of $CO_2$ levels are in a good range, an unhealthy high range or an unhealthy low range. Another display may include color-coded stratified regions in order to give a viewer an indication of energy expenditures of the ventilation system to keep the pre-set $CO_2$ level at constant and healthy levels.

One example of system 10 is being implemented by the inventors and named the "Auto41" system which has an array of sensors and an intelligent algorithm embedded in a mobile device's specific application (app). The algorithm is explained in more detail below. The system can be used without any training. In operation, the system detects the presence of an individual or individuals in a confined environment, such as a small office or a car, and passively assess his/her/their metabolic rate. The system also provides an indoor air quality index based on carbon dioxide level and the air change rate changes to maintain good IAQ. The Auto41 system is an always-on system, so it can be used anytime, as soon as it detects occupancy.

Figures 2, 2A:
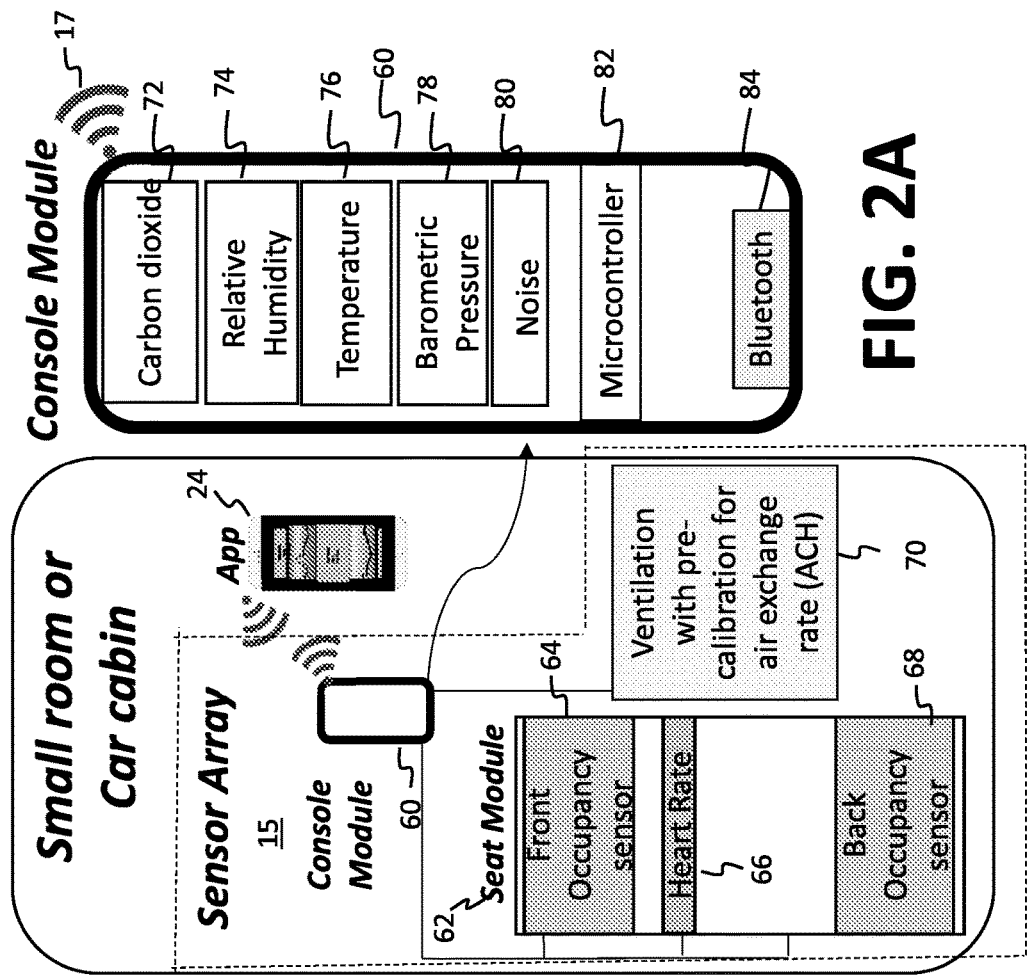
FIG. 2 schematically shows an example of a sensor array for an enclosure, such as a small room or car cabin.
FIG. 2A schematically shows a more detailed illustration of the sensor array console module.

Referring now to FIG. 2, an example of a sensor array for a small room or car cabin is shown schematically. The sensor array 15 includes a console module 60, a seat module 62, and ventilation module with pre-calibration for air change rate (ACH) 70. The console module 60 includes a number of sensors for detecting, for example, carbon dioxide levels, environmental comfort parameters (e.g. temperature, humidity, pressure) and noise. The seat module 62 may include sensors for detecting heart rate and occupancy (using a sensor based on pressure detection for weight). The ventilation 70 is pre-calibrated for air change rate.

The sensor array ventilation module can include flow sensor(s) and pre-calibrates the system for air change rate. In another embodiment, the seat module can be replaced with an optical or virtual modules that are designed to determine number of occupants and heart rates [9, 10].

The sensor array 15 may be incorporated into the Auto41 system and integrated into the console module 60 and seat module 62 for monitoring occupancy, environmental comfort conditions, $CO_2$, weight, and/or heart rate, and setting air change rates. The system enables the exploration of health-related outcomes under never-before implemented, "freely-behaving conditions with good indoor air quality assurance" so that researchers can further the understanding of the ongoing obesity epidemic in the United States. It is hypothesized that assessing metabolic rate passively and for prolonged periods of time will provide an unprecedented opportunity of data mining to find patterns of environment-person-metabolic rate interactions related to the obesity epidemic.

Referring now to FIG. 2A, a more detailed illustration of the sensor array console module is schematically shown. Console module 60, in one example, may include a carbon dioxide sensor 72, a relative humidity sensor 74, a temperature sensor 76, a barometric pressure sensor 78, noise sensor 80, a microcontroller 82 for onboard signal processing and a Bluetooth® chip 84. Those skilled in the art are familiar with such commercially available components. Readings from each or any of the sensors may be transmitted to a user interface 24 for further processing, or/and may be processed by the onboard software application implementing the system algorithm.

Experimental Examples

Having described the salient components of the herein disclosed system for assessment of metabolic rate and maintenance of indoor air quality, experimental results will now be discussed to promote further understanding of the components of the invention. Two different settings were used to probe the assessment air change rate, and metabolic rate for a classroom and a car cabin under variable $CO_2$ levels. One additional setting was used to probe the assessment of metabolic rate in a car cabin, while maintaining constant $CO_2$ levels by an actuated ventilation previous calibrated for air change rate.

Classroom: This allowed implementation of the passive metabolic assessment system in a large room along with the assessment of averaged metabolic rate in the class, as well as the assessment of air change rate (ACH).

Car cabin: This allowed the assessment of an individual's metabolic rate value, and characterization of the ACH under conditions of no-ventilation and recirculation mode, a mode typically used in cars to save cooling or heating energy. On a different setting, the car cabin allowed the assessment of metabolic rate under constant $CO_2$ conditions.

For sake of convenience, both scenarios are sometimes referred to herein as a "room".

Classroom tests: The classroom environment tests were conducted on Arizona State University's main campus in Tempe, Ariz. within the G-wing of the Engineering Center, room number 237 (ECG 237). The subjects for the classroom environment tests were from a set of classes that were conducted at ECG 237: an afternoon class of 18 and a morning class of 30. The ages of the classroom test subjects were from 18 to 30 years old. Results from the classroom tests were averaged out among the 18 and 30 respective occupants within each class. Individualized health results for each classroom test subject were not taken. Only an average age, weight, and height with a percentage of gender (which was ~60% for male, and ~40% female) was assessed with no identifiers from the occupants in the room, and used to estimate the expected average metabolic rate using Mifflin-St Jeor epidemiological Equation [3].

Car tests: The vehicle tests were conducted on residential streets within the city of Tempe in a Toyota Corolla with a car test subject, healthy 27-year-old adult male. The car environment tests portion of the study was approved by the Institutional Review Board of Arizona State University (IRB protocol #1304009100 for collection of environmental data, and #1012005855 for collection of metabolic rate data with portable indirect calorimetry technology). The test subject participated voluntarily, providing written consents to participate in the study. All tests for this study were conducted from February to April 2017. In another setting, the vehicle tests were conducted on Tempe Campus of Arizona State University by a second driver in a Hyundai, Electra (2012) car.

Sensors and Devices

A sensor system was built to conduct the tests. The system consisted of a carbon dioxide sensor, a temperature and humidity sensor (HOBO® unit), and a noise and pressure-based sensor to detect occupancy (details below). The sensors were connected to an external data logger. The carbon dioxide sensor was based on a double-beam non-dispersed infrared (NDIR) detector with a maximum $CO_2$ sensing wavelength of 4.26 μm [16, 17], [18]. Specifications of the sensor array includes an accuracy of ±50 ppm or 5% of reading and a repeatability of ±20 ppm as well as an operating range from 32° F. to 122° F. and 0 to 95% Relative Humidity, non-condensing. Calibrations using dilutions of a 5% carbon dioxide gas and pure air were completed before any study tests were conducted to assure the accuracy of the system $CO_2$ detection levels.

Sensors' Experimental Setup

The experimental setup for the classroom tests involved placing the sensor array in a location within ECG 237 that would provide readings that closely mirrored the average $CO_2$ concentration of the entire room. In this case, the noise sensor and pressure based sensor for occupancy were not used, and occupancy was assessed via physical person count. Two mid-size, 1-ft diameter fans were placed in the front and back of the room to ensure a well-mixed environment. The sensor was started at 4:00 PM on Feb. 20, 2017 and collected data the entire night and early morning. This was done to obtain a more representative $CO_2$ concentration profile. At about 10:17 AM on Feb. 21, 2017 the sensor's data logger was stopped and all data was collected.

The experimental setup for the vehicle tests optimized the placement of the $CO_2$, temperature, and humidity sensors in locations that would give the most accurate representation of the average $CO_2$ concentration of the entire car volume. The sensor was placed in the front dashboard approximately a meter from the driver. Conditions such as the opening and closing of windows were tracked and varied over a series of tests. The vehicle tests were conducted with the same occupant for all tests. In addition, testing of single occupancy was corroborated with the noise and pressure-based sensors, which are described in the result and discussion section.

Modeling

The base development of the model considers prior state of art by the World Health Organization to monitor indoor pollutant concentrations [6], and includes the following assumptions:

The only source of $CO_2$ generated is from a room's occupants.

Once all occupants leave, $CO_2$ is assumed to decay until equilibrium is reached with the outside baseline value at approximately 350-450 ppm.

The air is displaced via the room's natural and/or mechanical ventilation systems.

The model considers the following total differential equation for the change in $CO_2$ concentrations:

$$\frac{d[CO_2]}{dt} = \frac{d[CO_2]_{gen}}{dt} + \frac{d[CO_2]_{ven}}{dt} \qquad \text{Eq. (1)}$$

where $[CO_2]_{gen}$ is the carbon dioxide generated by the room's occupant, and $[CO_2]_{ven}$ is the carbon dioxide ventilated from the room. Three situations were modeled and measured: a—Ventilation and no occupants in the room, b—Ventilation and occupants in the room, c—No ventilation and occupants in the room.

a—Ventilation and no occupants in the room: In this condition, the generation is assumed to be 0, and the differential equation simplifies to the following:

$$\frac{d[CO_2]_{gen}}{dt} = 0 \rightarrow \frac{d[CO_2]}{dt} = \frac{d[CO_2]_{ven}}{dt} \qquad \text{Eq. (2)}$$

$$\frac{d[CO_2]}{dt} = -k_{ven}[CO_2]^x$$

where $k_{ven}$ is the Air Change Rate, and the unknown (x) ventilation order can be determined by plotting the following relationships:

Zeroth Order Ventilation: $[CO_2]=[CO_2]_i-k_{ven}t$
First Order Ventilation: $\ln[CO_2]=-k_{ven}t+\ln[CO_2]_i$
Second Order Ventilation:

$$\frac{1}{[CO_2]} = \frac{1}{[CO_2]_i} + k_{ven}t$$

As will be discussed in the results section, the first order ventilation rate law yielded the highest R-squared values for all decays. Consequently, the ventilation reaction rate constant ($k_{ven}$) is equivalent to the Air Change Rate (ACH), defined here as A. The first order type of decay validated previous studies conducted by Escombre and Bouhamra et. al. [19, 20]. Therefore, Eq. (1) is simplified to:

$$\frac{d[CO_2]}{dt} = -k_{ven}[CO_2]^1 = -\lambda[CO_2]^1 \qquad \text{Eq. (3)}$$

Solving for the indoor $CO_2$ concentration in an interval where the $CO_2$ concentration ranges between an initial value $[CO_2]$, and a final value $[CO_2]$ for all times intervals generates the following analytical expression for $[CO_2]$:

$$\int_{[CO_2]_i}^{[CO_2]} \frac{1}{[CO_2]} d[CO_2] = -\int_{t_i}^{t} \lambda \, dt \rightarrow \ln[CO_2] - \ln[CO_2]_i = -\lambda t$$

$$\ln[CO_2] = \ln[CO_2]_i - \lambda t \qquad \text{Eq. (4)}$$

$$[CO_2] = [CO_2]_i e^{-\lambda t} \qquad \text{Eq. (5)}$$

b—Ventilation and occupants in the room: the second scenario considered the generation of $CO_2$ from occupants with an ACH different from 0. In this situation, Eq. 1 can be generically expressed:

$$\frac{d[CO_2]}{dt} = \frac{d[CO_2]_{gen}}{dt} - \lambda[CO_2] \qquad \text{Eq. (6)}$$

and solved, considering the $CO_2$ concentration at steady state (S.S.). Making this assumption the differential equation simplifies to the following:

$$\text{At } S.S.: 0 = \frac{d[CO_2]_{gen}}{dt} - \lambda[CO_2] \rightarrow \lambda[CO_2] = \frac{d[CO_2]_{gen}}{dt}$$

$$\text{At } S.S.: \frac{d[CO_2]_{gen}}{dt} = \lambda[CO_2] = \lambda[CO_2]_{gen}$$

Assuming the following boundary condition

At $t=0 \rightarrow [CO_2]=[CO_2]_i$ where $[CO_2]_i$ refers to any $CO_2$ above the baseline atmospheric concentration initially present, and a baseline atmospheric concentration of $CO_2$, $[CO_2]_0$, which is equivalent to 350 to 450 ppm, the following analytical expression for $[CO_2]$ is obtained:

$$[CO_2] = [CO_2]_0 + [CO_2]_{gen}(1 - e^{-\lambda t}) + [CO_2]_i e^{-\lambda t} \qquad \text{Eq. (7a)}$$

-continued $$[CO_2]_{gen} = \frac{[CO_2]_0 + [CO_2]_i e^{-\lambda t} - [CO_2]}{e^{-\lambda t} - 1} \quad \text{Eq. (7b)}$$

Eq. (7a) and (7b) was used to fit the experimental data with units defined as follows: Air Change Rate (ACH), $\lambda$=hour$^{-1}$; Initial Concentration of carbon dioxide, $[CO_2]_i$=ppm, Outdoor $CO_2$ Concentration, $[CO_2]_0$=ppm; Generated $CO_2$, $[CO_2]_{gen}$=ppm; and time, t=hour.

Alternatively or as an added measure, pressure measurements can be used to determine ACH based on physical principles that is independent of chemical species. Volumetric flow follows the equation:

$$Q = k(\Delta p)^{0.5} \quad \text{Eq. (8)}$$

where Q is the volumetric flow rate, k is a calibration constant, and $\Delta p$ is pressure change of the enclosure.

As a result, by measuring the pressure change, the flow rate can be determined. The air change rate (ACH) can subsequently be determined since it is proportional to Q. When the ventilation is turned on, the pressure inside the room will temporarily increase. The pressure will decrease due to leakage and eventually reach a plateau. This plateau value is expected to be a function of the rate at which fresh air entering the enclosure equals air leaked. When the ventilation is turned off, the pressure inside the enclosure will decrease, according to the equation:

$$\Delta p = \Delta p_{plateau} e^{-ACH \cdot t} \quad \text{Eq. (9)}$$

where $\Delta p_{plateau}$ is the plateau pressure difference, and ACH is the air change rate. As can be seen from the equation:

$$ACH = \ln(2)/t_{1/2} \quad \text{Eq. (10)}$$

where $t_{1/2}$ is the time it take to reach half of the plateau value, ln denotes natural logarithm. Therefore, by measuring $t_{1/2}$, the air change rate (ACH) can be determined. It is important to point out that this approach allows frequent correction of changes in ACH, thus allowing more accurate and robust measurements, even when there are changes in the environments.

Assessment of indoor air quality and metabolic rate: In environments where occupants are coming in and out and leave an empty room, the air change rate was determined with experimental decay values by taking the natural logarithm of the $CO_2$ concentration and plotting it against the time at which the decay began. The slope of the line corresponded to an ACH value. The ACH value, denoted as $\lambda$ (hour$^{-1}$), along with the room's volume (V) is related to the ventilation rate (Q) via the following equation [19]:

$$Q = \lambda * V \quad \text{Eq. (11)}$$

The ventilation rate is needed to solve the generated $CO_2$ ($[CO_2]_{gen}$) [21]

$$[CO_2]_{gen} = \frac{CO_2 \text{ source generation rate}}{\text{Room ventilation rate}} * 10^6 \text{ ppm} = \frac{P}{Q}(\text{ppm}) \quad \text{Eq. (12)}$$

Plotting experiment values from the classroom and vehicle tests, and extracting known values of $\lambda$, V, $[CO_2]_o$, and $[CO_2]_i$, the value of P was fitted and empirically determined after completing a series of iterations. For example, the Microsoft Excel® What-if-analysis Goal Seek function was used for part of this work to determine values of P that produced the smallest percent error between the experimentally obtained $CO_2$ concentrations and values obtained via the developed model (Eq. 7).

Understanding the phenomena of cellular respiration has allowed for the development of a model that directly relates metabolic rate to consumed $O_2$ ($VO_2$) rate and produced $CO_2$ ($VCO_2$) rate by a living being. This relationship was developed by physiologist J. B. de V. Weir [22, 23]:

$$\text{Metabolic Rate}\left(\frac{\text{kcal}}{\text{day}}\right) = \left[3.941\left(VO_2\left(\frac{L}{\text{min}}\right)\right) + 1.11\left(VCO_2\left(\frac{L}{\text{min}}\right)\right)\right] * 1.440 \quad \text{Eq. (13)}$$

In the absence of $VO_2$ rate readings, such as in the Double Labeled Water Method [8], the concept of Respiratory Quotient (RQ) can be used to relate $VCO_2$ to $VO_2$ [24]. RQ is the ratio of the produced carbon dioxide rate ($VCO_2$) and consumed oxygen rate ($VO_2$) of a person:

$$RQ = \frac{VCO_2}{VO_2} \quad \text{Eq. (14)}$$

The RQ can be implemented into the Weir equation giving the following relationship between metabolic rate, and $VCO_2$ [24]:

$$\text{Metabolic Rate}\left(\frac{\text{kcal}}{\text{day}}\right) = \left[3.941\left(VCO_2\left(\frac{L}{\text{min}}\right)\right) + RQ + 1.11\left(VCO_2\left(\frac{L}{\text{min}}\right)\right)\right] * 1.440 \quad \text{Eq. (15)}$$

The RQ is typically in the range of 0.67 to 1.2 and depends on the specific substrate undergoing cellular respiration [24]. However, studies have found the weighted average of RQ to be 0.86 [25]. Inputting this value into the Weir equation provides a simplified metabolic rate calculation:

$$\text{Metabolic Rate}\left(\frac{\text{kcal}}{\text{day}}\right) = 8.19\left(VCO_2\left(\frac{\text{mL}}{\text{min}}\right)\right) \quad \text{Eq. (16)}$$

Using the developed Weir equation and the described-above mathematical model, the $VCO_2$ will be able to be quantified via passive environmental $CO_2$ sensors and used to determine a person's metabolic rate or the average metabolic rate in a group of a room's occupants. It is worthy to mention that, this is another important contribution by the present model that has not been reported before.

c—No ventilation and occupants in the room: the third testing scenario considered the generation of $CO_2$ from occupants, and no ventilation (ACH=$\lambda$=0). In this condition, the generation from occupant(s) can be considered zero order since the constant production of $CO_2$ is intrinsic from the person as far as the person is living, and produced from consumed food and energy storage (person's glycogen, fat, proteins) [26, 27]. Note that this is another important contribution by the present model that has not been associated before. Therefore, Eq. (1) can be generically expressed as $$\frac{d[CO_2]}{dt} = k_{gen}[CO_2]^0 \quad \text{Eq. (17)}$$

and solved as follows:

$$[CO_2] = k_{gen}t + S \qquad \text{Eq. (18)}$$

where S can be considered as follows from the boundary condition:

$$\text{At } t=0 \rightarrow [CO_2] = S = [CO_2]_0 + [CO_2]_i$$

with $[CO_2]_0$, the baseline concentration based on $CO_2$ atmospheric concentration, and $[CO_2]_i$ additional $CO_2$ concentration from a remaining source. Therefore, the following analytical expression for $[CO_2]$ is applicable:

$$[CO_2] = k_{gen}t + [CO_2]_0 + [CO_2]_i \qquad \text{Eq. (19)}$$

with $k_{gen}$ (ppm/min), ppm could be defined as mL of exhaled $CO_2$/L of exhaled air volume=mL of exhaled $CO2/dm^3$ exhaled air volume, $k_{gen}$ (ppm/min)×V (room volume) $(dm^3)$=$VCO_2$ (mL $CO_2$/min), and $VCO_2$ can be directly applied to Eq. (16) to assess metabolic rate.

Results

Classroom Tests Under Variable $CO_2$ Levels

In order to determine the capability of the Equations involved in the algorithm of the system presented in the present invention, the $CO_2$ generation rate from a group of individuals in a classroom as well as the classroom Air Change Rate (ACH) were evaluated first. The generated carbon dioxide from a room's occupants was used to calibrate ACH of the room ventilation, and it was an advantage since: 1—it avoids the assessment of leakage functions and mechanical ventilation airflow rates, 2—$CO_2$ is a chemically inert, and non-toxic gas, and 3—the release of $CO_2$ concentrations from a room's occupants cause indoor concentrations to be greater than outdoor concentrations resulting in an outdoor-indoor concentration gradient [28]. Once all occupants of a room leave, the indoor $CO_2$ concentrations decline until outdoor and indoor concentrations reach equilibrium and this decay can be used to determine the room's ACH [25].

Figure 3:
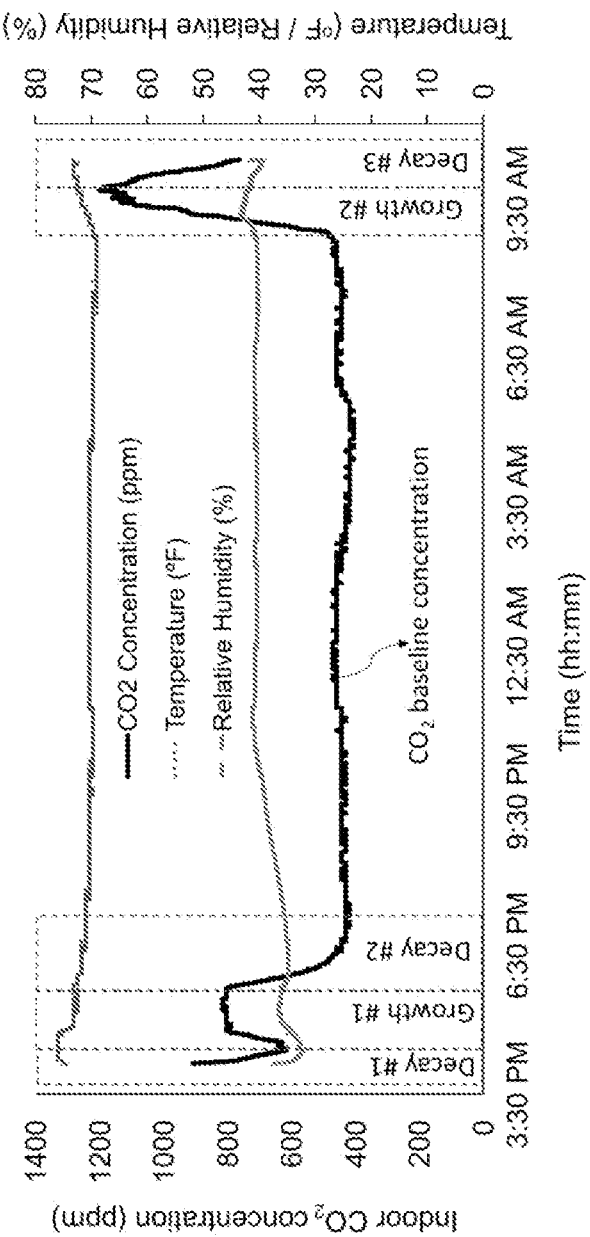
FIG. 3 shows data including temperature, relative humidity, and $CO_2$ concentrations vs. time within a room for a classroom test of an assessment system.

Referring now to FIG. 3, raw $CO_2$ concentrations, relative humidity (RH), and temperature vs. time from the classroom test are graphically shown. The classroom test was conducted on Feb. 20, 2017 from 4:06 PM to 10:17 AM in the next day. The data show variable fluctuations of growths and decays with a long period of relatively constant concentrations. Temperature, relative humidity, and $CO_2$ concentrations vs. time within room ECG 237 for Classroom test taken on February $20^{th}$ to $21^{st}$ from 4:06 PM to 10:17 AM. The left y-axis corresponds to the $CO_2$ concentration in ppm, while the right y-axis corresponds to the temperature in ° F. and relative humidity in %. Measurements were updated every 30 seconds. "Decay #1" starts at 4:06 PM and ends at 4:22 PM. "Decay 2" occurs from 5:38 PM to 6:22 PM, and "Decay 3" occurs from 9:39 AM to 10:16 AM. "Growth 1" starts at 4:22 PM and ends at 5:38 PM, and "Growth 2" starts at 8:35 AM to 9:39 AM.

The sensor's data logging started in the middle of a decay, labeled as "decay #1". The decline in $CO_2$ levels continued until approximately 4:22 PM where there was a reversed $CO_2$ level growing trend labeled "growth #1". Growth #1 was a clear indicator that the room gained occupants as the scheduled class time was approached. Concentrations rose until a plateau value was obtained at about 4:52 PM. The plateau showed that steady-state $CO_2$ concentration was reached, and that the difference between the $CO_2$ being produced and the ventilation rate was approximately zero. The plateau continued until 5:38 PM which corresponded to the course's dismissal time. A decay, labeled "decay #2", took place until the indoor $CO_2$ concentration matched outside levels. The baseline value was attained at about 6:22 PM and was determined to be at about 436 ppm. A growth in concentration, labeled "growth #2", occurred at 8:35 am where the $CO_2$ levels rose rapidly, and reached quasi-steady state. At 9:39 AM, the last observed decay, "decay #3", occurred. Growth #2 and decay #3 corresponded to the arrival and dismissal of the morning class.

Figures 4A, 4B, 4C:
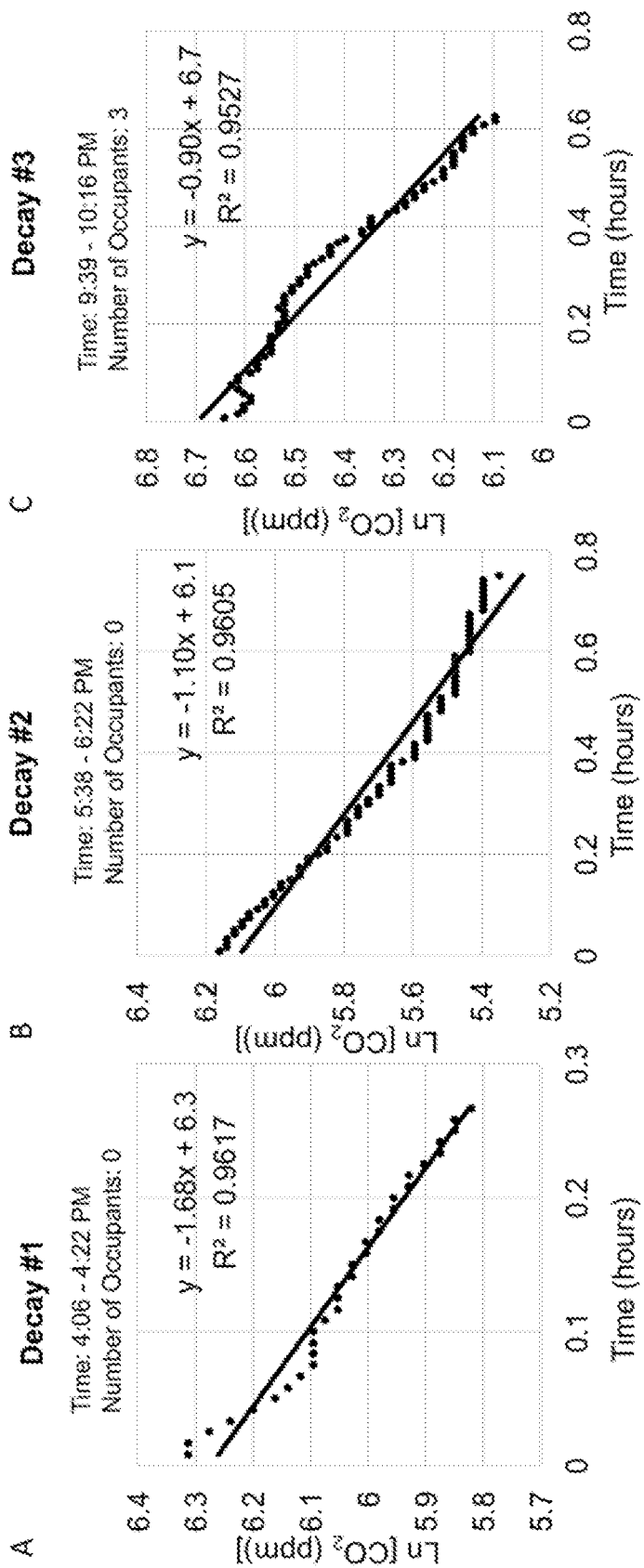
FIG. 4A-FIG. 4C, graphically show experimental data of $CO_2$ levels corresponding to decay #1, #2, and #3 from FIG. 3.

Referring now to FIG. 4A-FIG. 4C, data of $CO_2$ levels corresponding to decays #1, #2, and #3 from FIG. 3, as ln $CO_2$ (ppm) vs. time are shown. FIG. 4A-FIG. 4C show an example graphical representation of the natural logarithm of $CO_2$ concentration in ppm vs. time in hours for: A—"Decay #1" that occurred from 4:06 to 4:22 PM, where no room occupants were present for the duration of the decay. The slope of the line is the ACH value, which was determined to be 1.68 hour$^{-1}$. B—"Decay #2" that occurred from 5:38 to 6:22 PM, where no room occupants were present for the duration of the decay. The ACH value was determined to be 1.10 hour$^{-1}$. C— "Decay #3" that occurred from 9:39 to 10:16 AM, where three room occupants were present for the duration of the decay. The slope was determined to be 0.90 hour$^{-1}$. This represents a typical mechanism for calibration of air change rate in environment with known environmental conditions. In an alternative approach, ACH can be determined or corrected real-time with a ambient air pressure sensor where the air change rate changes can be interpreted with Bernoulli's theory.

The linear behavior between $\ln[CO_2]$ and time, indicated that the ventilation rate has a first order behavior, and followed Eq. (4). Therefore, a linear fitting was performed to determine the ACH values, which rendered $R^2$ coefficients between 0.95-0.96. Table 1 summarizes the findings.

TABLE 1

ACH values from classroom tests providing pre-calibrated ventilation conditions to the system.

| λ | Classroom's Air Change Rate (hour$^{-1}$) |
|---|---|
| Decay #1 | 1.68 |
| Decay #2 | 1.10 |
| Decay #3 | 0.90 |

Note that the decay #1 was a period where the classroom had no occupants and the door remained open with ventilation supported by fans as described in the experimental section. On the contrary, decay #2 had no occupants also, but the classroom door was closed with ventilation supported by fans. On the other hand, decay #3 had the classroom door closed, fans were off but there were 3 occupants. The higher ACH value resulting from decay #1 with respect to decay #2 may due to the fact of having the door opened vs. closed. In addition, the fact of having slightly lower value in decay #3 vs. decay #2 could be attributed to the fans off and 3 occupants concurrently producing $CO_2$ in the room. It is worth noticing that Eq. (4) was used for decay #3, and it was assumed the contributions of 3 occupants left in the room after the presence of 30 occupants was not significant.

Figures 5A, 5B:
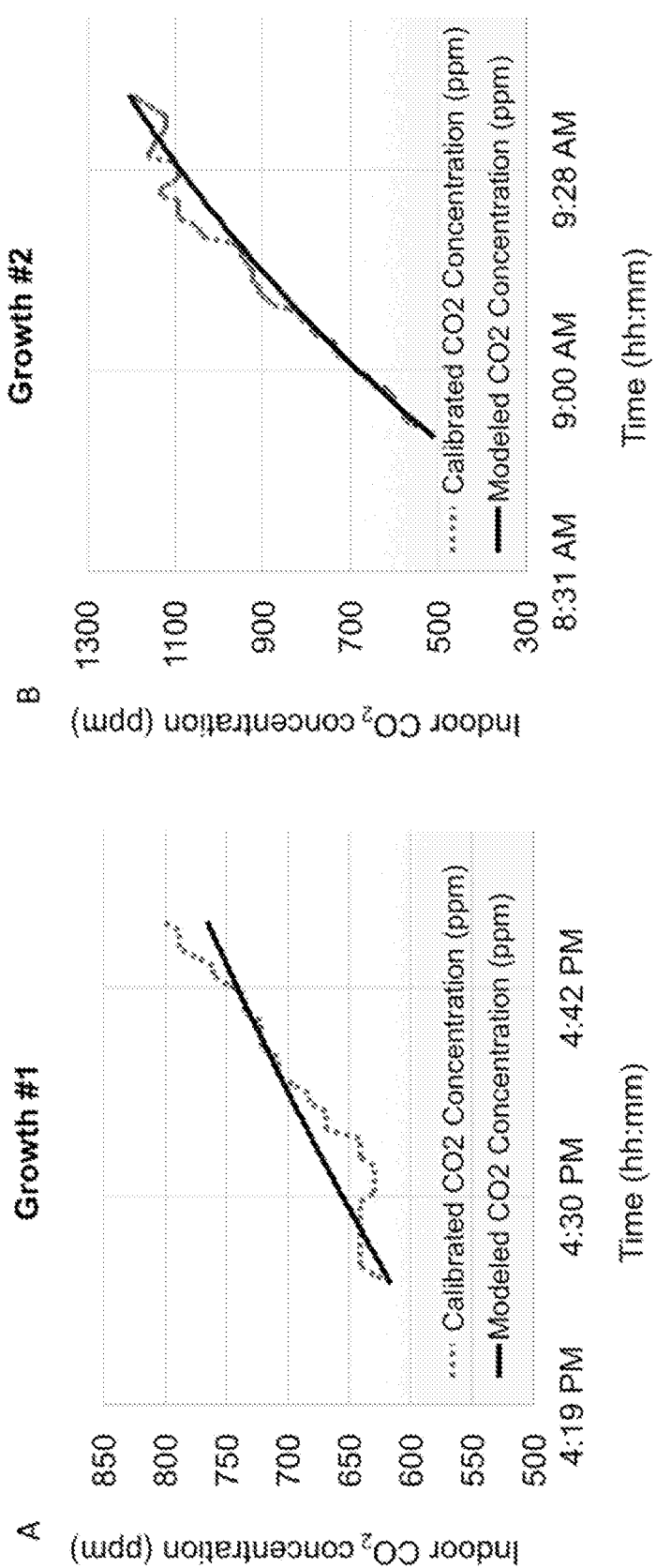
FIG. 5A-FIG. 5B graphically show experimental data representing $CO_2$ concentration (ppm) vs. time.

Referring now to FIG. 5A-FIG. 5B graphical representation of the $CO_2$ concentration (ppm) vs. time is shown. The fitted parameter is $[CO_2]_{gen}$ ($CO_2$ source generation rate) value for: A—"Growth #1" that occurred from 4:25 to 4:45 PM, where 18 room occupants were present. B—"Growth #2" that occurred from 8:51 to 9:39 AM, where 30 room occupants were present.

FIG. 5A-FIG. 5B shows the curves of periods for growth #1 and growth #2 from FIG. 3. In this case, fittings of the $CO_2$ levels to Eq. (7a) from the model were performed. The fitted parameter was the $CO_2$ source generation rate $[CO_2]_{gen}$, and the parameter $\dot{P}$ (in units of ppm/hour) was obtained by applying Eq. (12), using $\lambda$, $[CO_2]_i$, $[CO_2]_o$, and Q (room ventilation rate)=V (room volume)×$\lambda$) as known parameters. Since the number of occupants in the room for growth #1 and #2 were known, an averaged carbon dioxide production rate, $VCO_2$ per occupant was calculated, using the following expression:

$$\frac{\dot{P}}{Q} = \frac{VCO_2}{\sigma \times Q} \quad \text{Eq. (17)}$$

followed by the estimation of an average metabolic rate per person in the room. Table 2 summarizes the findings. The average metabolic rate values were 1511 and 1422 kcal/day, which were in coincidence with the level of metabolic rate estimated from the Mifflin-St Jeor Equation considering average age, average height, average weight, and gender percentage distribution. Although the results did not assess individuals' metabolic rate values, the use of the model to assess metabolic rate from environmental $CO_2$ detection (particularly Eq. (7a), (9), and (14)) has been demonstrated. As a consequence, similar tests were carried out in cars, hypothesizing that measured $CO_2$ level changes and the model can also assess metabolic rate from the driver.

TABLE 2

$CO_2$ source generation rate and metabolic rate calculation parameters from classroom tests

| Variables[a] | Growth #1 | Growth #2 |
| --- | --- | --- |
| Air Change Rate - $\lambda$ | 1.10 hour$^{-1}$ | 0.90 hour$^{-1}$ |
| Room Volume | 9720 ft$^3$ = 262,440 dm$^3$ | 9720 ft$^3$ = 262,440 dm$^3$ |
| Room Ventilation Rate - Q ($\lambda \times$ V) | ~9720 ft$^3$/hour | ~9720 ft$^3$/hour |
| Initial + Outside $CO_2$ Concentration - $[CO_2]_i$ + $[CO_2]_o$ | 616 ppm | 509 ppm |
| $CO_2$ source generation rate - $[CO_2]_{gen}$ | 410,000 ppm/hour occupant | 450,000 ppm/hour occupant |
| Fitting Percent Error | 6% | 6% |
| Metabolic rate Calculation Parameters[b] | | |
| $[CO_2]_{max}$ | ~771 ppm | ~1216 ppm |
| $\sigma$ - # of room occupants | 18 | 30 |
| $VCO_2$ | 184 mL/min | 174 mL/min |
| Metabolic rate | 1511 kcal/day | 1422 kcal/day |

[a]known and fitted parameters using Eq. (7a), [b]Metabolic rate/calculation parameters, using
$\frac{\dot{P}}{Q} = \frac{VCO2}{\sigma \times Q}$ and Eq. (16).

Vehicle Tests Under Variable $CO_2$ Levels

A total of four vehicle tests were conducted. Three of them were performed between the months of March and April 2017, and the final test took place in September 2017. Table 3 shows a summary of the dates of the 3 first tests as well as the testing conditions. These tests were assessed on three consecutive dates where outside temperature and humidity were in a narrow range of 75-83° F., and 25-30% RH, respectively. In all tests, the integrated sensor data in the car seats were used to assure two main points, number of persons in the car, and whether the person(s) was/were talking. The integrated pressure sensor in the seats indicated the presence of one person in all tests, while the noise sensor indicated that the driver of the car was talking while driving.

TABLE 3

Three of four vehicle tests' testing

| | | | |
| --- | --- | --- | --- |
| Date | Mar. 11, 2017 | Mar. 12, 2017 | Mar. 13, 2017 |
| Time of Test | 9:33 PM-10:22 PM | 9:34 PM-10:09 PM | 9:35 PM-10:12 PM |
| Location of Sensor | Front middle dashboard | Front middle dashboard | Front middle dashboard |
| Year, Make, & Model of Vehicle | 2007 Toyota Corolla | 2007 Toyota Corolla | 2007 Toyota Corolla |
| Number of Occupants | 1 Occupant | 1 Occupant | 1 Occupant |
| Occupant Conditions | Talking through the duration of the experiment | Talking through the duration of the experiment | Talking through the duration of the experiment |

TABLE 3-continued

| | Three of four vehicle tests' testing | | |
|---|---|---|---|
| Testing Environment | Windows Closed & No Circulation (recirculation) | Windows Closed & No Circulation (recirculation) | Windows Opened |
| Car Environment | Residential Streets | Residential Streets | Residential Streets |

Figure 6A:
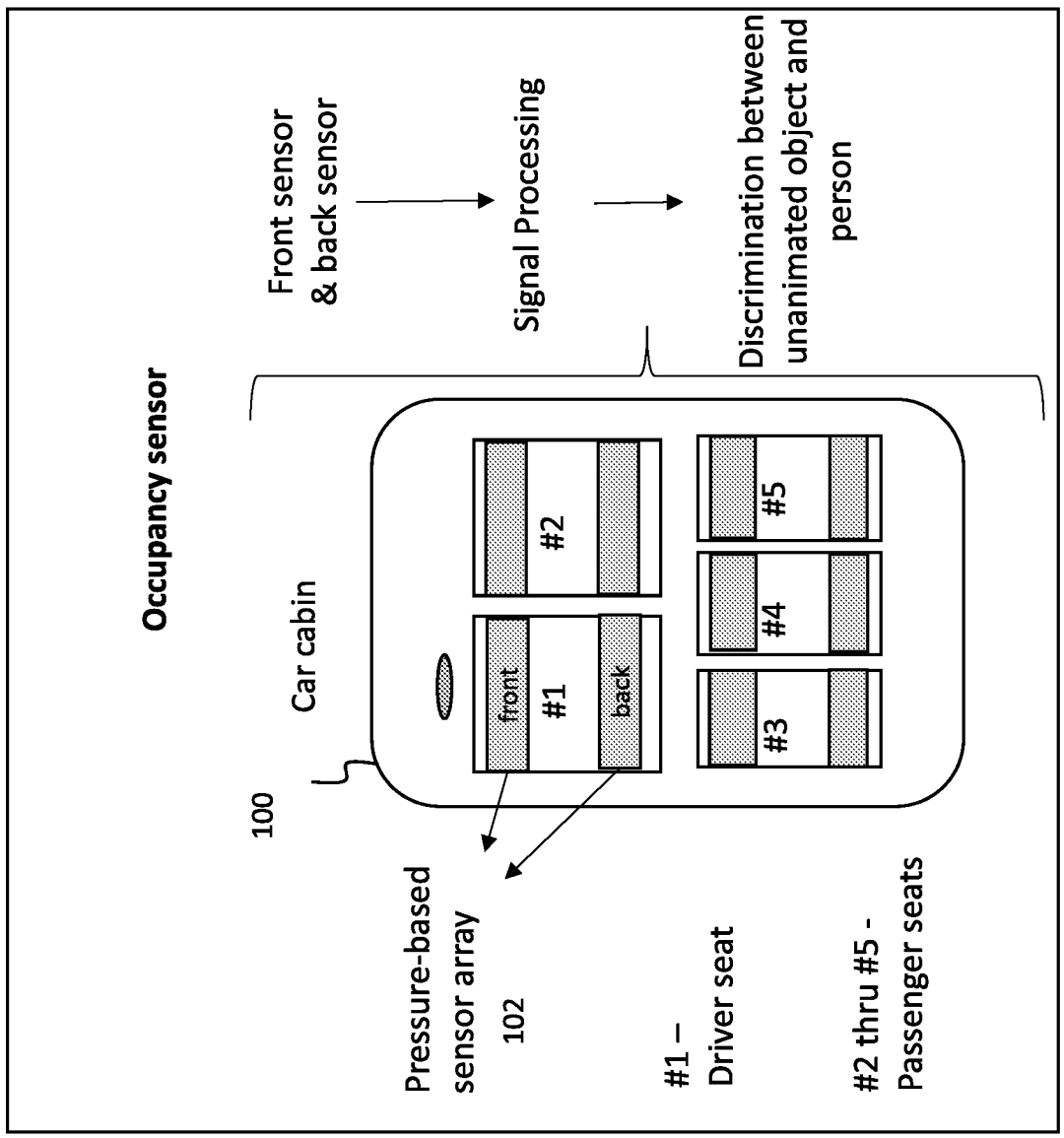
FIG. 6A-FIG. 6C schematically show an example of an occupancy sensor. As an example, the pressure-based sensor has two fractions that allow to detect object presence and movement from a person.
Figure 6B:
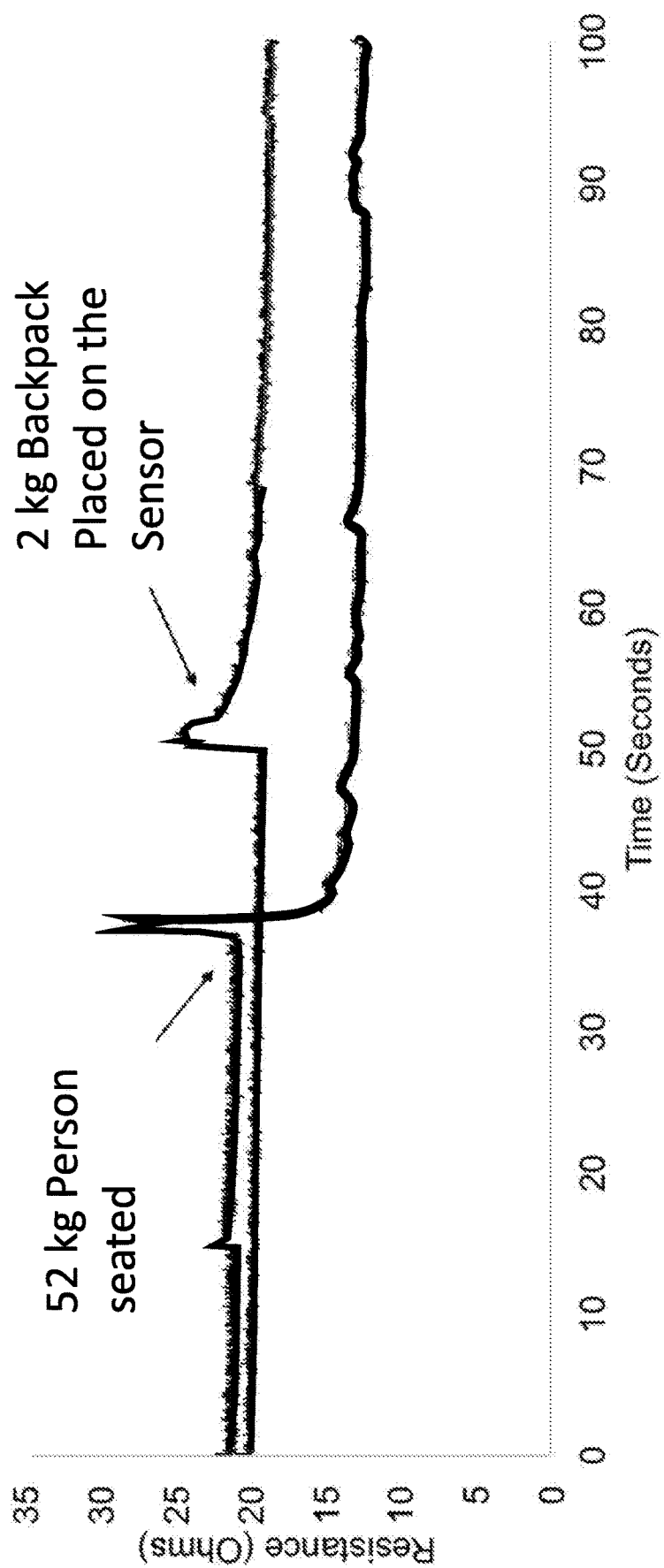
Figure 6C:
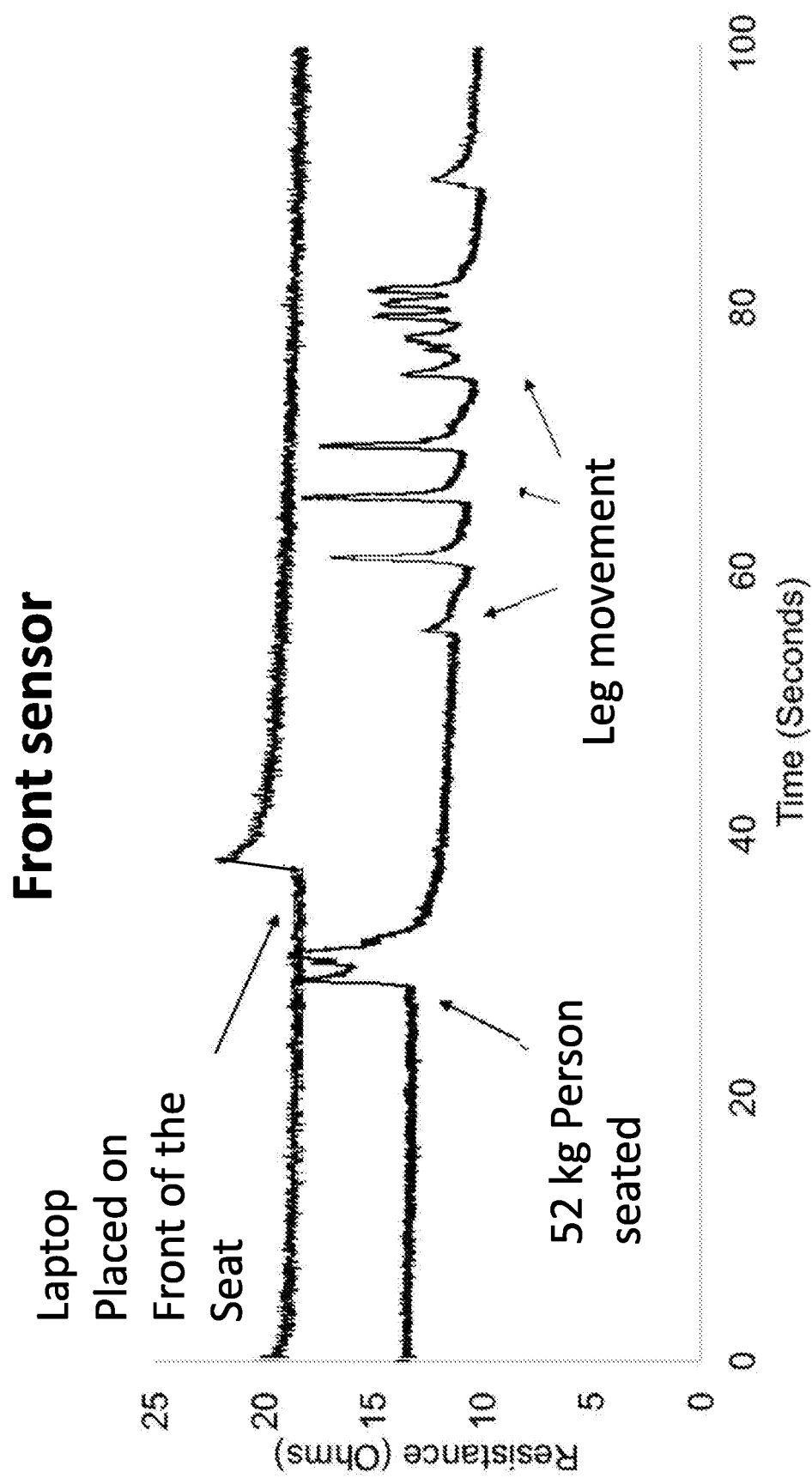

Referring now to FIG. 6A-FIG. 6C, in FIG. 6A an example of a schematic representation of the pressure-based sensor indicating the number of occupants in the car. An occupancy sensor 102 was located on each seat of the car, and had two sections, front and back, that allowed detecting object presence and movement. The movement is important to discriminate between unanimated objects (e.g. bags) on the seat, and a person. FIG. 6B-FIG. 6C each shows a typical trace of sensor signal for both sensor components, which enables discrimination of an object from a person. The sensors were tested in the lab and later integrated in a car. Back (plot B) and front (plot C) sensor signal for detection of an object and a person.

Figures 7A, 7B, 7C:
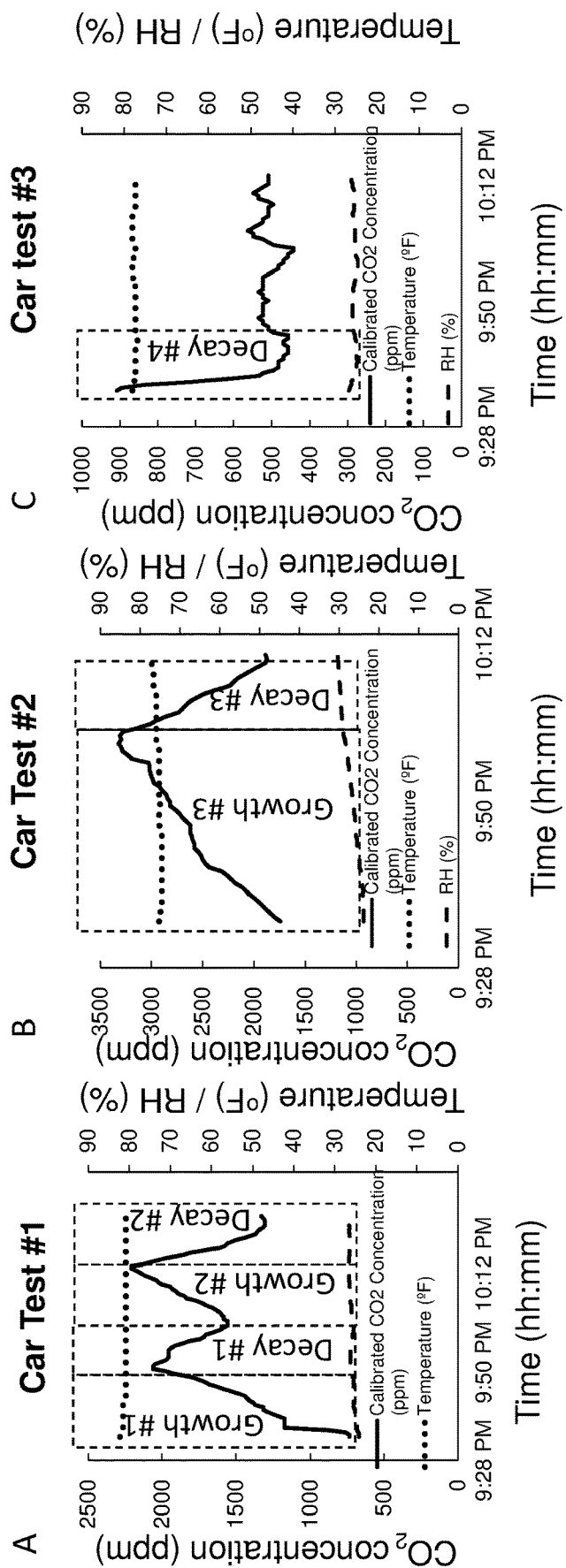
FIG. 7A-FIG. 7C graphically show experimental data including temperature, relative humidity (RH), and $CO_2$ concentrations vs. time within a 2007 Toyota Corolla while driving in testing conditions.

Referring now to FIG. 7A-7C, the $CO_2$ levels, temperature and relative humidity vs. time recorded during car tests #1, #2, and #3, respectively, while a single occupant was present in the car are shown. Temperature, relative humidity (RH), and $CO_2$ concentrations vs. time within a 2007 Toyota Corolla while driving in testing conditions shown in Table 3. The left y-axis corresponds to the $CO_2$ concentration in ppm, while the right y-axis corresponds to the temperature in ° F. and relative humidity in %. Measurements were updated every 30 seconds. A—is a plot of Car test #1 taken on Mar. 11, 2017 from 9:33 PM to 10:22 PM. B—is a plot of Car test #2 taken on Mar. 12, 2017 from 9:34 PM to 10:09 PM. C—is a plot of Car test #3 taken on Mar. 12, 2017 from 9:35 PM to 10:15 PM.

The raw results for the vehicle tests #1 and #2, where windows were closed and ventilation was shut-off, show alternating growths and decays of $CO_2$ levels. The growths are due to generation of $CO_2$, and periods of $CO_2$ decay are observed due to the automatic activation of the ventilation system of the car. It is interesting to notice that in the case of test #1, the ventilation powered on automatically for about 10 minutes after 15 minutes of driving, even though air conditioning was manually set to a level of zero. In the same run, the ventilation system automatically turned on again ~12 min. later. In the case of test #2, the automatic ventilation system turned on ~24 min. after the car was started. The decay periods observed in the car test #1 are labeled "decay #1" and "decay #2". The decay period observed in the car test #2 has been labeled "decay #3". These $CO_2$ decay periods occurred while the driver was still inside the car, and therefore, there was a source of significant generation of $CO_2$. As a consequence, Eq. (4) can no longer be applied to assess ACH. The ACH must be assessed using Eq. (7a), once the $CO_2$ source generation rate ($[CO_2]_{gen}$) is determined. Along this line, $[CO_2]_{gen}$ can be determined from the growth $CO_2$ level periods, assuming the ACH is negligible, and therefore Eq. (19) is applied. It is worth to notice that, in the case of Eq. (19), $[CO_2]_{gen}$ is determined as $k_{gen}$ (with convenient conversion units, ppm/hour).

Figures 8A, 8B, 8C:
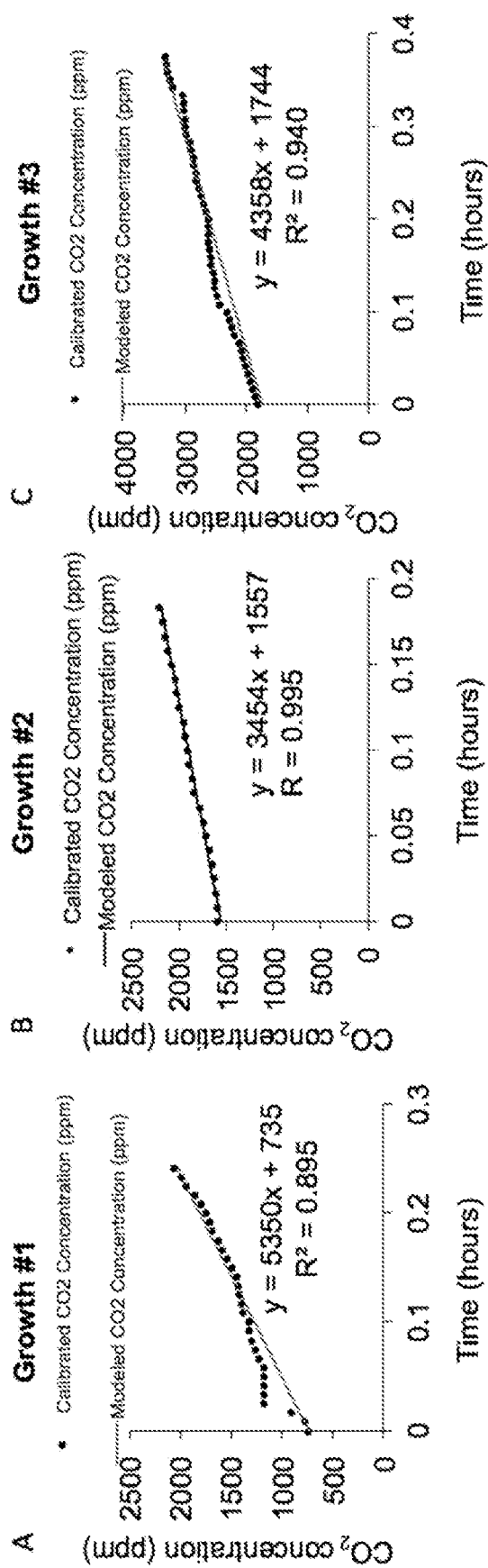
FIG. 8A-FIG. 8C graphically show experimental data including growth of $CO_2$ concentration vs. time.

Referring now to FIG. 8A-FIG. 8C, graphical representations of the $CO_2$ concentration vs. time are shown. Eq. (19) is applied to fit the growths from car tests #1 and #2, which has been named "growth #1" and "growth #2" for the car test #1, and "growth 3" for the car test #2. The fitted parameter is $k_{gen}$ to assess $CO_2$ source generation rate from Eq. (19) for: A—"Growth #1" that occurred from 9:33 to 9:49 PM in car test #1, B—"Growth #2" that occurred from 9:59 to 10:10 PM in car test #1, C-"Growth #3" that occurred from 9:35 to 9:57 PM in car test #2.

Table 4 shows a summary of the calculation of metabolic rate, resulting from the analysis.

TABLE 4

| | $CO_2$ source generation rate and metabolic rate from car tests | | | |
|---|---|---|---|---|
| Metabolic rate Calculation | Growth #1 | Growth #2 | Growth #3 | Average (SD) |
| Outside + Initial $CO_2$ Concentration – $[CO_2]_o$ + $[CO_2]_i$ | 735 ppm | 1557 ppm | 1744 ppm | n/a |
| $k_{gen} = [CO_2]$/hour | 5350 ppm/hour | 3454 ppm/hour | 4348 ppm/hour | 4384 (948) ppm/hour |
| $R^2$ - regression coefficient | 0.895 | 0.995 | 0.940 | n/a |
| Fitting Percent Error (average Absolute error for each data point) | 6.1% | 0.9% | 3.3% | n/a |
| Car Volume | 90.3 ft$^3$/2438 dm$^3$ | 90.3 ft$^3$/2438 dm$^3$ | 90.3 ft$^3$/2438 dm$^3$ | 90.3 ft$^3$/2438 dm$^3$ |
| σ - # of room occupants | 1 | 1 | 1 | 1 |
| VCO$_2$ (with t = 60 min) | | | | 176(35) mL/min |
| Estimated metabolic rate | | | | 1433(285) kcal/day |
| Measured metabolic rate (Breezing ™) | | | | 1510 kcal/day |
| Difference Error | | | | 5% |

With the empirically determined $k_{gen}$ (ppm/min) from car test #1 and #2, which rendered an average of 4383 ppm/hour or 73.1 ppm/min. VCO$_2$ (mL CO$_2$/min) was determined with the following procedure: VCO$_2$ (mL CO$_2$/min)=$k_{gen}$ (ppm/min)×V (room volume) (2438 dm$^3$)=176.3 mL CO$_2$/min, and VCO$_2$ can be directly applied to Eq. (13) to assess metabolic rate, which rendered a value of 1433 kcal/day.

Referring now to FIG. 9A-FIG. 9D, experimental data including $CO_2$ concentration vs. time is graphically shown. The fitted parameter is ACH to assess the automatic ventilation in the car when the ventilation system was voluntarily set at shut-off conditions. Eq. (7a) is used for the assessment, utilizing $[CO_2]_{gen}$ assessed under no ventilation conditions (FIG. 6): A—"Decay #1" that occurred from 9:52 to 9:58 PM in car test #1, B—"Decay #2" that occurred from 10:11 to 10:20 PM in car test #1, C—"Decay #3" that occurred from 9:59 to 10:05 PM in car test #2, D—Decay #4 that occurred from 9:35 to 9:38 PM in car test #3.

Figure 9B:
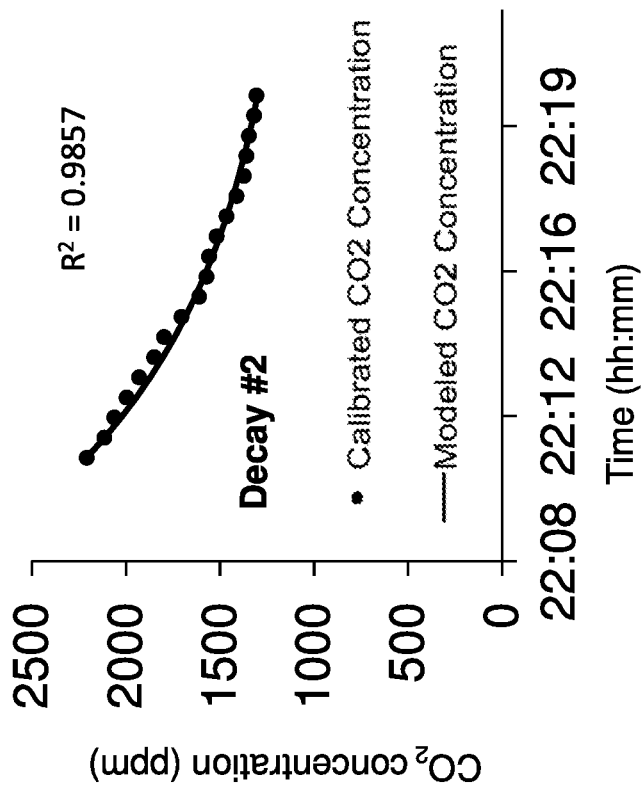
FIG. 9A-FIG. 9D graphically show experimental data including decay of $CO_2$ concentration vs. time.
Figure 9A:
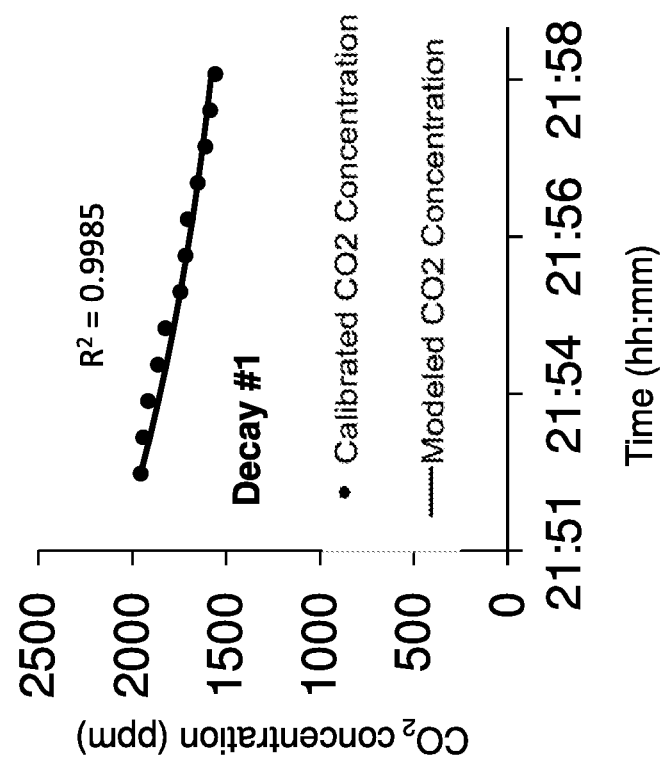
Figures 9C, 9D:
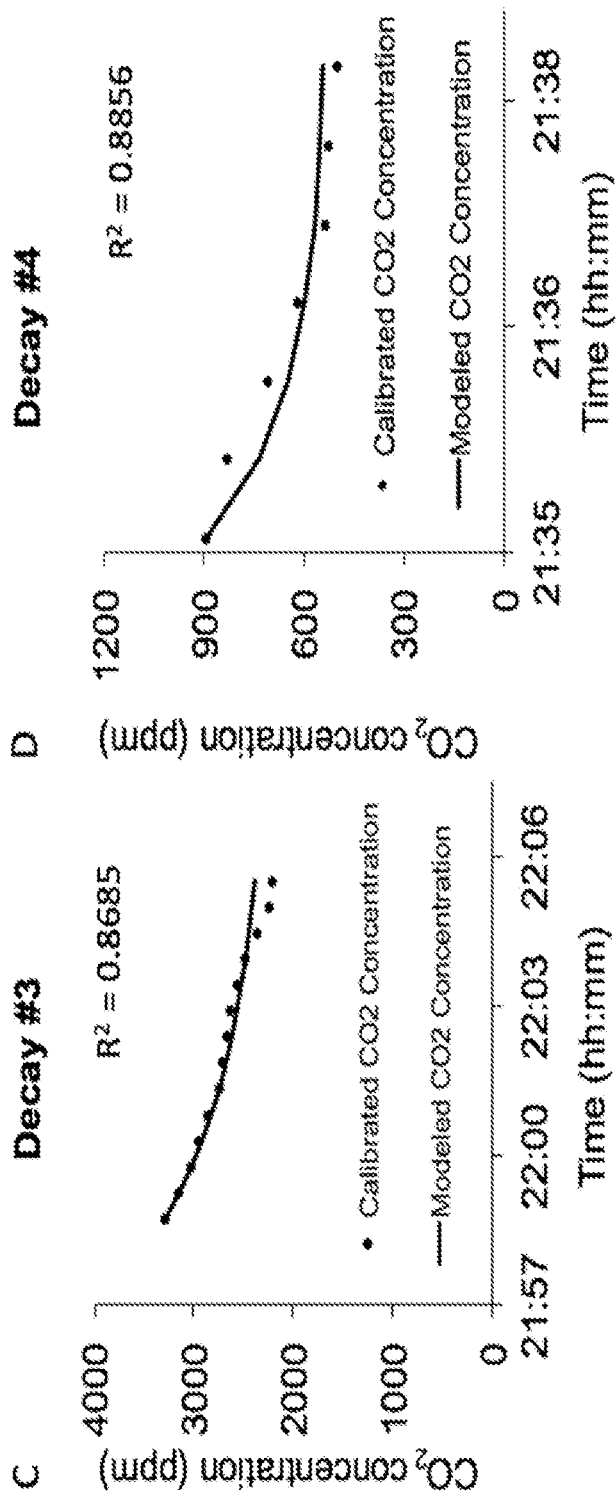

Using the $k_{gen}$ determined before, the ACH for the automatic ventilation in the car was assessed. FIG. 9A-FIG. 9C show the fitting of decay #1, decay #2, and decay #3 for car test #1 and #2, respectively, using the Eq. (7), and Table 5 summarizes the results, indicating that the average ventilation rate is (9.6±0.9) hour$^{-1}$ as well as other parameters resulting from the fitting results from experimental values to the model. For first time, the automatic ventilation rate of a car at recirculation conditions (AC max mode—ventilation system shut-off conditions) has been assessed. This mode of ventilation is set in the cars to avoid excessive build-up of $CO_2$ [29].

The third vehicle test was conducted on Mar. 11, 2017 from 9:35 PM to 10:12 PM. The testing conditions are noted on Table 3. The $CO_2$ concentrations vs. time are graphically displayed in FIG. 9D, as well as the corresponding fitting to Eq. (7), utilizing an averaged $k_{gen}$ of 4384 ppm/hour assessed from the driver under no ventilation conditions. As it can be observed in Table 5, the air change rate was ~69.5 hour$^{-1}$, which is ~7 times higher than at closed window and recirculation condition due to the fact the windows were opened.

addition to the quantification of the metabolic rate of an individual or group. Experimental results from the classroom test show that the average metabolic rate from the two classes taken was 1511 kcal/day and 1422 kcal/day which are within ~5% of the 1500 kcal/day average expected for the group of students [6]. The classroom scenario validates the accuracy of model and techniques employed to determine the $CO_2$ source generation rate. The vehicle tests yielded metabolic rate average of 1433 kcal/day with a 5% error with respect to a reading from a validated mobile indirect calorimeter (Breezing®), which assessed a metabolic rate of 1510 kcal/day.

It is important to note that 5% discrepancy is an acceptable level for clinically relevant evaluation. It is also important to notice that the variability between assessments was relatively large (~20%), given that the subject may have faced different metabolic rates set up by free-living conditions factors. The variability of a person's metabolic rate can be affected by numerous environmental factors such as daily stress, sleep, diet, medications, physical activity, and even exposure to chemicals, pollutant and weather factors. In this regard, the assessment of metabolic rate measurements under free-living conditions is valuable for observing daily variability, as well as averaging higher resolution measures to assess more representative metabolic rate values. In this

TABLE 5

$CO_2$ source generation rate and calculation parameters from car tests

| Variables | Decay #1 | Decay #2 | Decay #3 | Decay #1, #2, and #3 Average(SD) | Decay #4 |
|---|---|---|---|---|---|
| Conditions | | Windows closed and recirculation on | | | Windows open |
| Air Change Rate - λ | 9.4 hour$^{-1}$ | 10.5 hour$^{-1}$ | 8.8 hour$^{-1}$ | 9.6 ± 0.8 hour$^{-1}$ | 69.5 hour$^{-1}$ |
| Car Volume | 90.3 ft$^3$/2438 dm$^3$ | 90.3 ft$^3$/2438 dm$^3$ | 90.3 ft$^3$/2438 dm$^3$ | | 90.3 ft$^3$/2438 dm$^3$ |
| Room Ventilation Rate - Q | 22,132 dm$^3$/hour | 24,690 dm$^3$/hour | 20,734 dm$^3$/hour | | 163,234 dm$^3$/hour |
| Initial $[CO_2]_i$ | 1220 | 1473 | 1540 | | 425 |
| $[CO_2]_{max}$ | 1956 | 2208 | 3283 | | 894 |
| Baseline concentration - | 735 ppm | 735 ppm | 1744 ppm | | 469 ppm |
| Average absolute error for each data point | 1.2% | 1.3% | 2.2% | | 6.3% |
| $R^2$ | 0.9985 | 0.9857 | 0.8685 | | 0.8856 |
| Average percentage significance of $[1 - \exp(-\lambda t)]$ term | 20% | 22% | 33% | | ~0% |
| Average percentage significance of $[\exp(-\lambda t)]$ term | 80% | 78% | 67% | | ~100% |
| σ - # of room occupants | 1 | 1 | 1 | | 1 |

In order to assure that the ACH is null in a closed ventilation setup and that there is no $CO_2$ generation being introduced in the car cabin from the car's combustion engine, a fourth test was performed as a control experiment with the car engine on, and the ventilation system closed.

Figure 10:
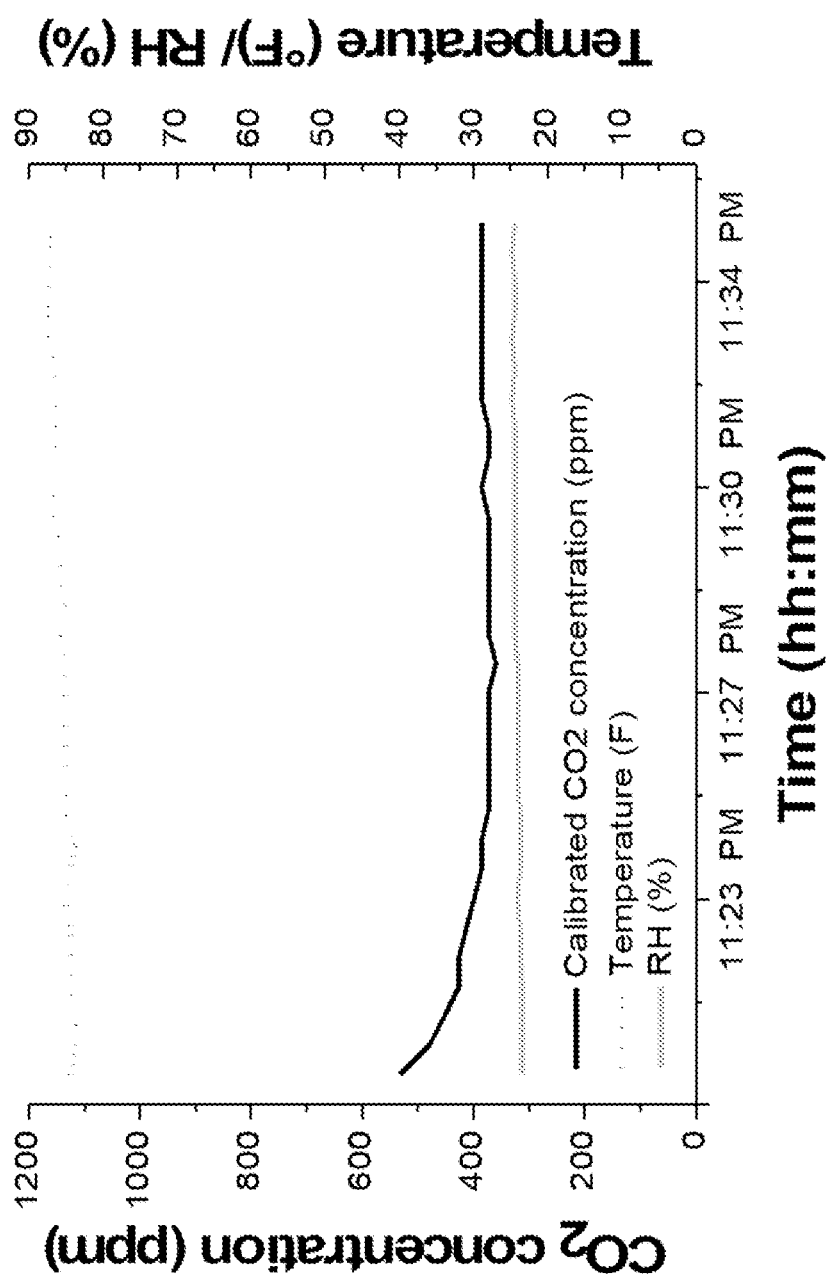
FIG. 10 graphically shows temperature, relative humidity (RH), and $CO_2$ concentrations vs. time within a car while driving with the ventilation system closed, and the driver breathing in and out of the car cabin via a tubing system that precludes exhaled carbon dioxide build up.

Referring now to FIG. 10, parameters of temperature, relative humidity (RH) and carbon dioxide levels are shown for the fourth test. Temperature and relative humidity were similar to the previous car tests, and the carbon dioxide levels did not change significantly from the baseline level recorded right before the car test.

A new method of tracking the metabolic activity of individuals in confined environments using a sensor array to measure exhalation rate of $CO_2$ and subsequent modeling the individual's metabolic rate using the Weir equation has been disclosed herein. The model also allowed for the assessment of the indoor air quality of a room or vehicle in regard, the present method uses proven validity in a previous study performed under controlled conditions. The previous study probed that the assessment of metabolic rate from prolonged testing of carbon dioxide production rate in intubated patients is a good surrogate and replacement of more expensive assessment performed with Gold Standard Indirect calorimetry Instrument Parvo Medics [25].

In addition, the present study has revealed that indoor $CO_2$ concentrations are consistently above 600 ppm in both classroom and vehicle settings and therefore, there is an imminent need of detection of metabolic rate under free-living conditions with good maintenance of indoor air quality. The threshold value at which indoor occupants begin to experience SBS related symptoms and illnesses is at or above 600 ppm. Concentrations in vehicle settings reached levels as high as 3000 ppm and rarely dipped below 600 ppm. Drivers subjected to these conditions for extended periods of time may experience fatigue, drowsiness, and loss of focus [30]. This needs is the motivation for the present invention.

Vehicle Tests Under Constant $CO_2$ Levels

One additional setting was used to probe the assessment of metabolic rate in a car cabin, while maintaining constant $CO_2$ levels by an actuated ventilation previous calibrated for air change rate. The car (Hyundai. Electra) cabin's ventilation system was pre-calibrate for conditions with AC on, and recirculation of air off. Table 6 summarizes the corresponding ACH values.

TABLE 6

ACH values from vehicle tests providing pre-calibrated ventilation conditions to the system.

| Ventilation setting | Air Change Rate, $\lambda$ (hour$^{-1}$) |
|---|---|
| 1 | 0.92 |
| 2 | 0.43 |
| 3 | 0.70 |
| 4 | 0.61 |

Figure 11A:
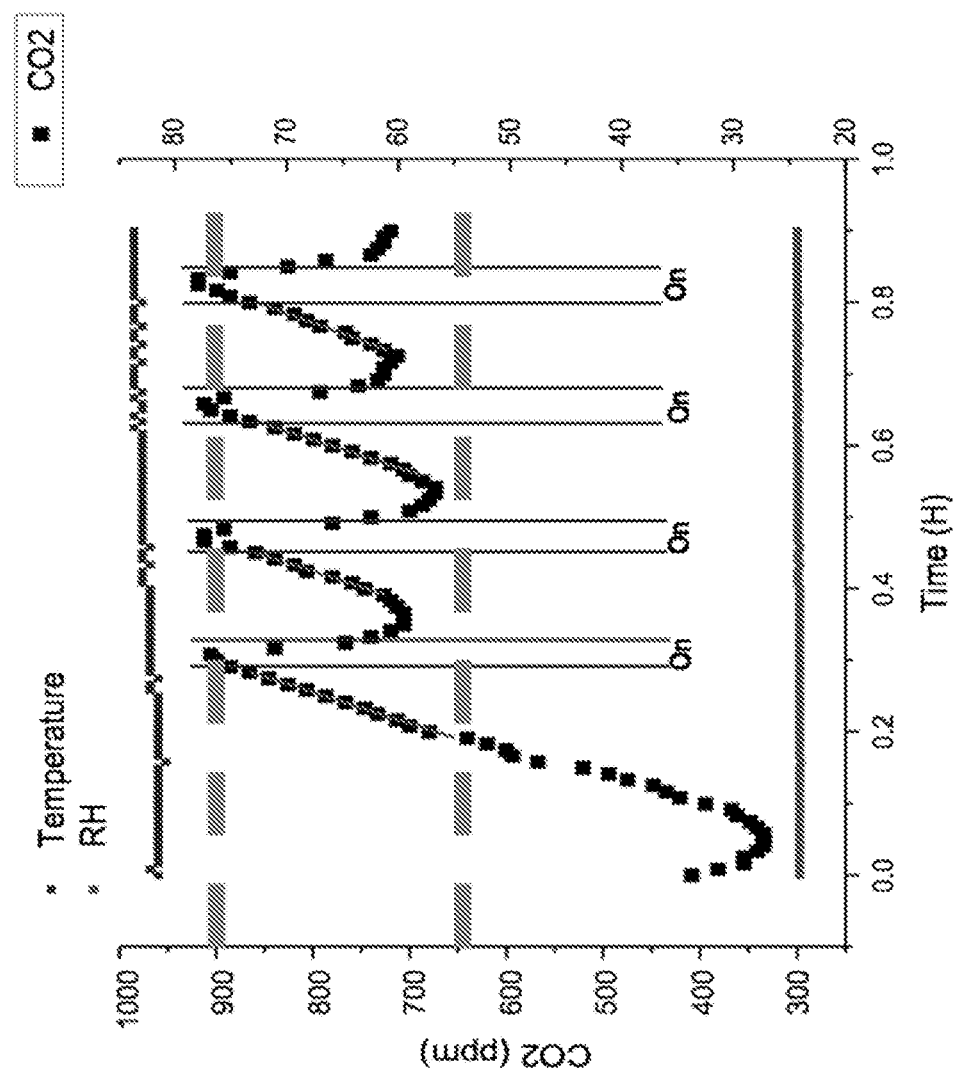
FIG. 11A-FIG. 11C graphically show experimental data including $CO_2$ concentration, $VCO_2$, and metabolic rate vs. time.
Figure 11B:
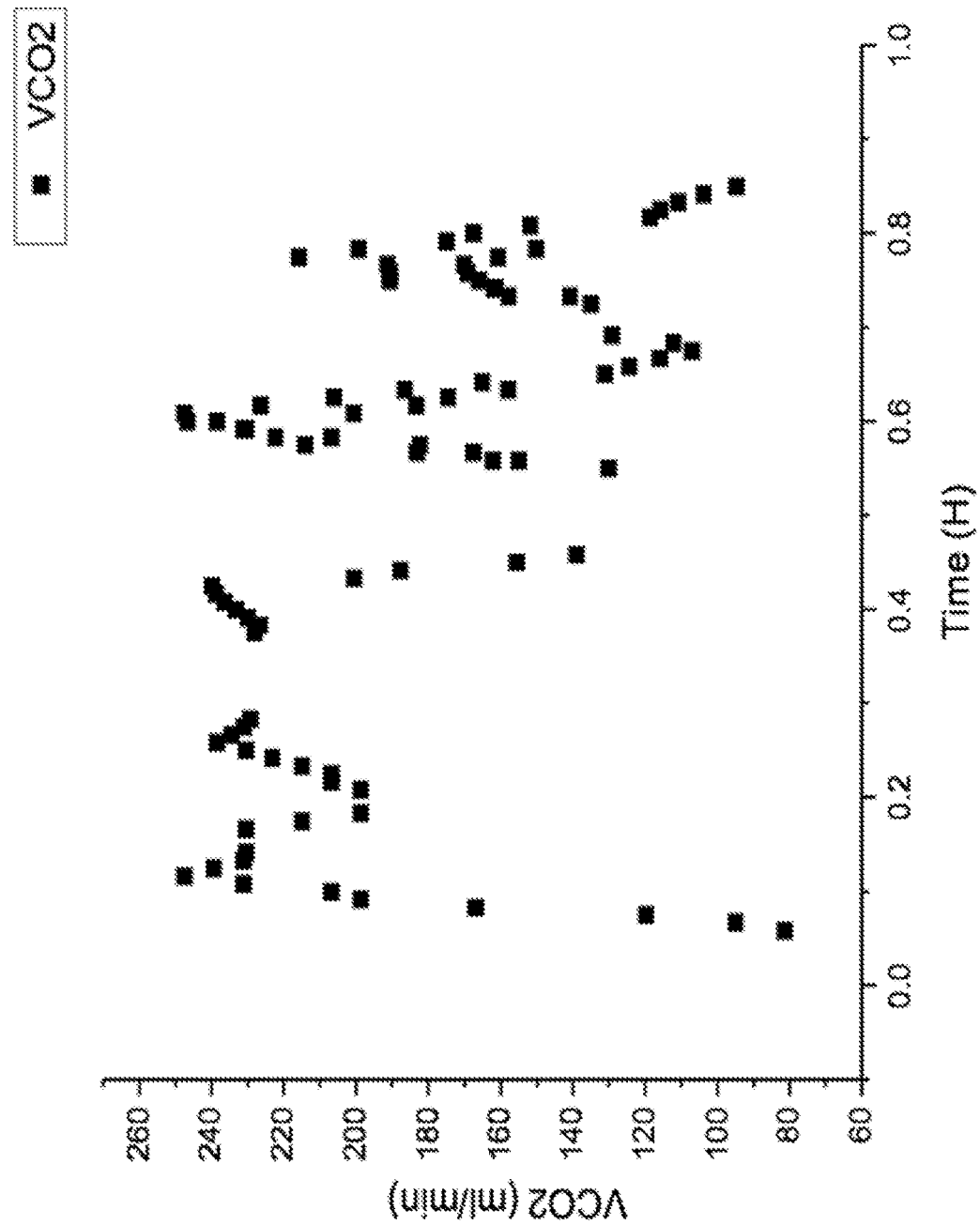
Figure 11C:
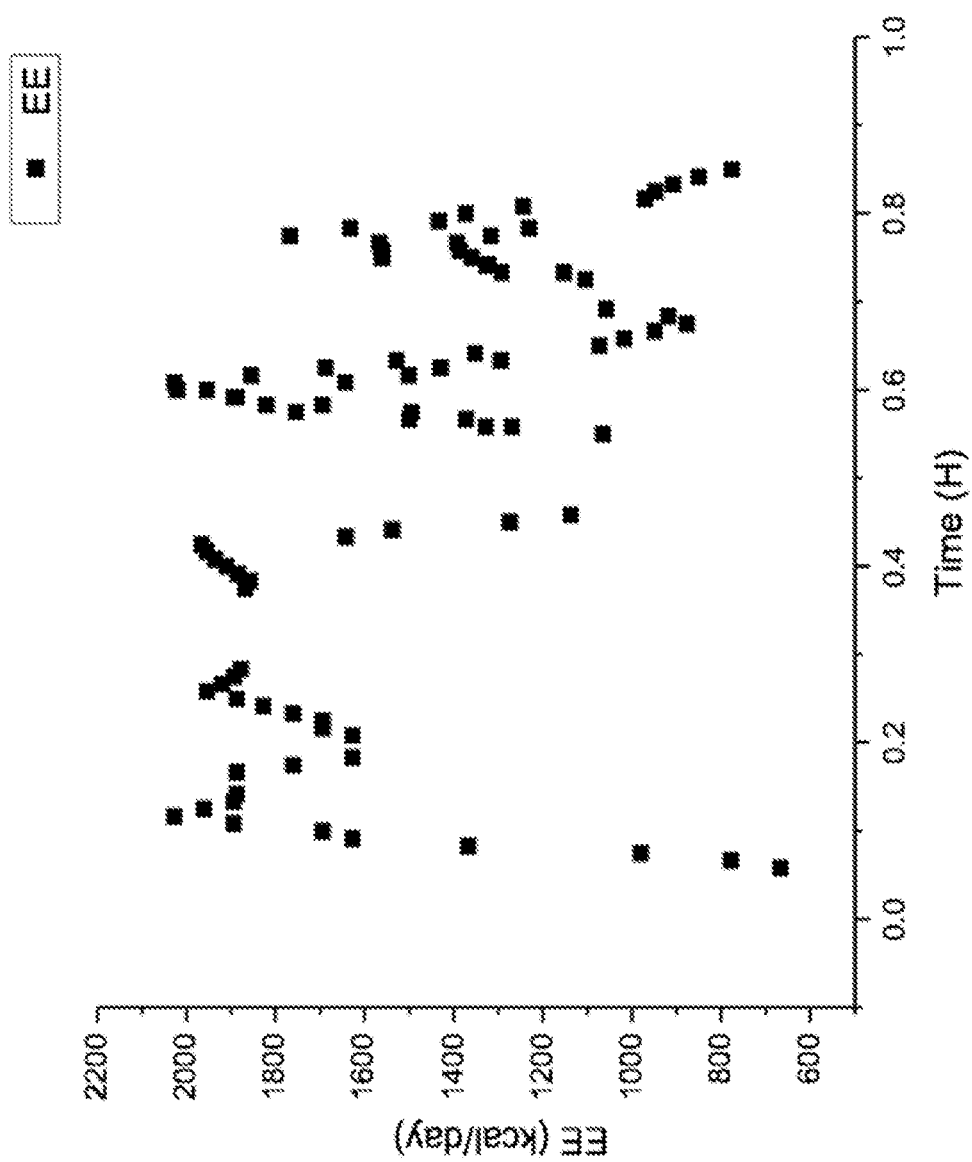

Referring now to FIG. 11A-FIG. 11C, the data shown there illustrates an example of an algorithm employed in a method and system for assessing metabolic rate and maintaining indoor air quality using passive environmental sensors. The automatic ventilation condition was pre-set to have $CO_2$ levels between 650-900 ppm, and a pre-calibration of ACH was used for assessment of $VCO_2$, and metabolic rate. The $CO_2$ shows the period of time the ventilation was turned "on" to maintain a healthy IAQ level.

The system changes the ventilation setting with pre-calibration for air change rate to maintain a constant level of $CO_2$, and determined $\Delta$ACH. Eq. (7b)-(9), Eq. (13) and related expressions are used to assess $[CO_2]_{gen}$, $VCO_2$, and metabolic rate. This disclosure along with its related disclosed features demonstrate the capacity of the system to assess metabolic rate, which is distinctive from previous reported inventions and general knowledge of someone skilled in the art [4b].

With the ability to determine the $CO_2$ level, and the previous assessed metabolic rate for the individual, a ventilation system could realistically forecast $CO_2$ concentrations in a closed environment and accordingly adjust the rate of ventilation to prevent $CO_2$ build-up. Based on the levels predicted, ventilation systems could be activated to raise ACH values by increasing supply of air entering the specific room.

Figure 12:
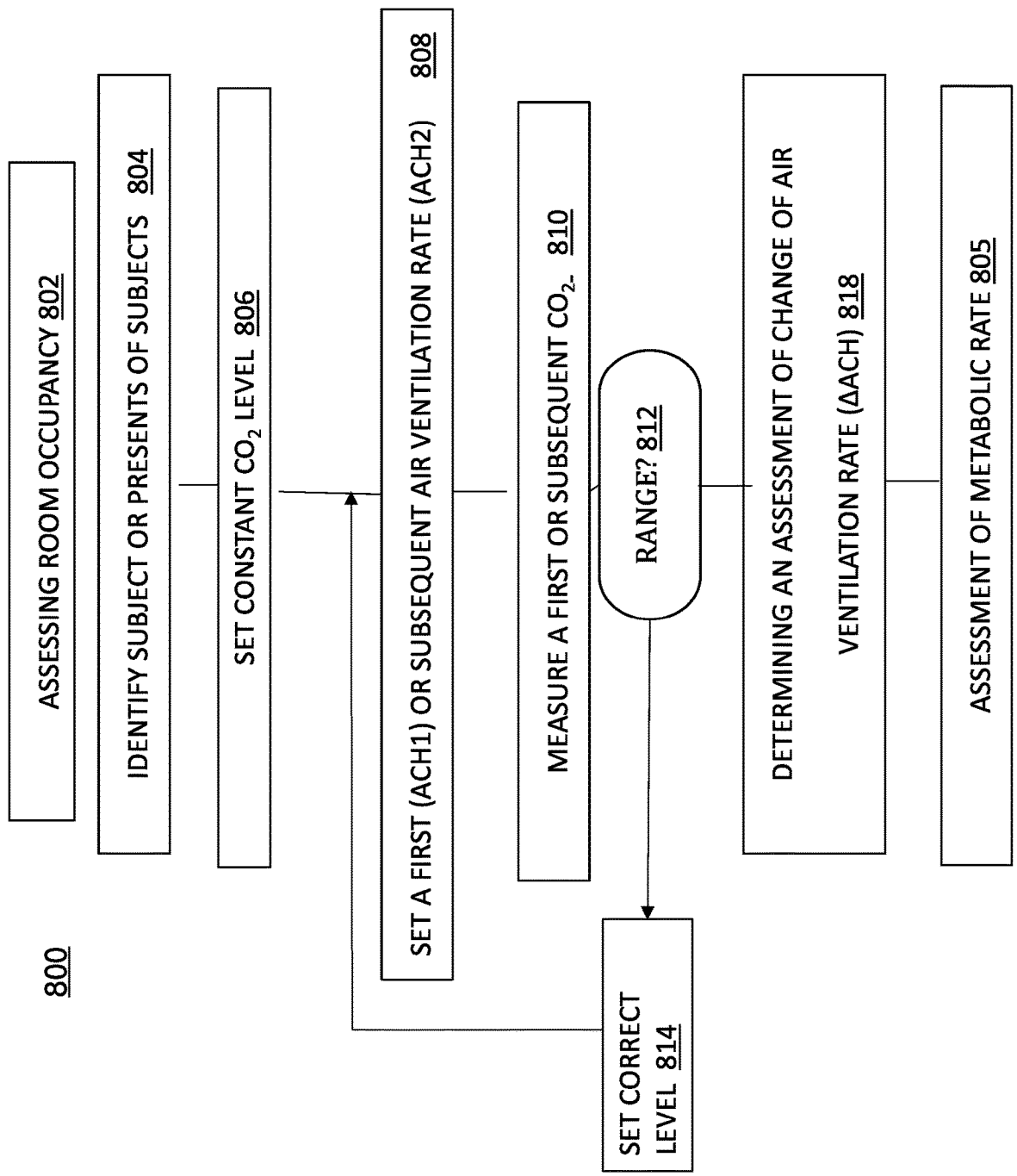
FIG. 12 schematically shows a block diagram illustrating an example of an algorithm employed in a method and system for assessing metabolic rate and maintaining indoor air quality using passive environmental sensors.

Referring now to FIG. 12, a block diagram illustrating an example of an algorithm employed in a method and system for assessing metabolic rate and maintaining indoor air quality using passive environmental sensors is shown. The algorithm may be embodied in a software program 800 including the acts of receiving sensor data 802, identifying the presence of a subject or subjects 804, setting a constant $CO_2$ level as a goal for the ventilation system to maintain 806, setting a first ACH 808, measuring a first $CO_2$ level 810, re-adjusting ACH (ACH2) to meet the $CO_2$ level goal 808, measuring a second $CO_2$ level 810, calculating the metabolic rate 805.

The Auto41 system automatically detects metabolic rate as soon as the occupancy sensor in the confined environment detects the sole person that daily uses the location. Similarly to the Doubly Labeled Water Method [1], Auto41 relates the metabolic rate to a respiratory quotient of 0.85, given by the following ratio:

$$RQ = \frac{VCO_2}{VO_2}, \quad \text{(Eq. 14)}$$

and calculates metabolic rate using:

$$VO_2 = VCO_2/0.85 \quad \text{(Eq. 20)}$$

and the simplified Weir equation:

$$\text{Metabolic Rate} \left(\frac{\text{kcal}}{\text{day}}\right) = 8.19\left(VCO_2\left(\frac{\text{mL}}{\text{min}}\right)\right). \quad \text{(Eq. 16)}$$

Auto41 passively assesses $VCO_2$ under free-living conditions using at least one environmental sensor of $CO_2$ and a model integrated into an intelligent algorithm in a confined environment. To the best of our knowledge, this is the first report of an alternative option to Doubly Labeled Water Method for assessment of metabolic rate in real-world living with (at the least) a daily measure with capability of maintaining $CO_2$ in a healthy range. Furthermore, the system can be free of user periodic calibration.

In one useful example, an integrated method for identification of occupants in a room based on energy-efficient IAQ, and biometrics 800 includes assessing room occupancy with at least one physical sensor 802, outputting an assessment of overall metabolic rate for multiple users or outputting an individual assessment of an individual's metabolic rate for a single user, setting an actuated ventilation system to a constant $CO_2$ level in a predetermined healthy range 806, where the actuated ventilation system includes at least one $CO_2$ sensor. After the level is set for a predetermined healthy range, then the actuated ventilation system is operated to measure a first air ventilation rate (ACH1) 808. Then the at least one $CO_2$ sensor to measures a first $CO_2$ level 810. Next, the actuated ventilation system determines if the $CO_2$ level is in a predetermined value within healthy range of 600-1000 ppm, if not then it supplies a signal to the actuated ventilation system to drive the $CO_2$ level into the predetermined healthy range. The actuated ventilation system calculates or measures a subsequent air ventilation rate (ACH2) 808 and operates the at least one $CO_2$ sensor to measure a subsequent $CO_2$ level 810. The actuated ventilation system determines if the $CO_2$ level is at the predetermined healthy range and if it is then determining an assessment of change of air ventilation rate ($\Delta$ACH), otherwise repeating acts 808-814 as detailed above.

In one example, the method further includes recognizing a particular subject 804 by operating a physical sensor where the physical sensor is selected from the group consisting of a weight sensor, a biometric sensor and combinations thereof.

Figure 13:
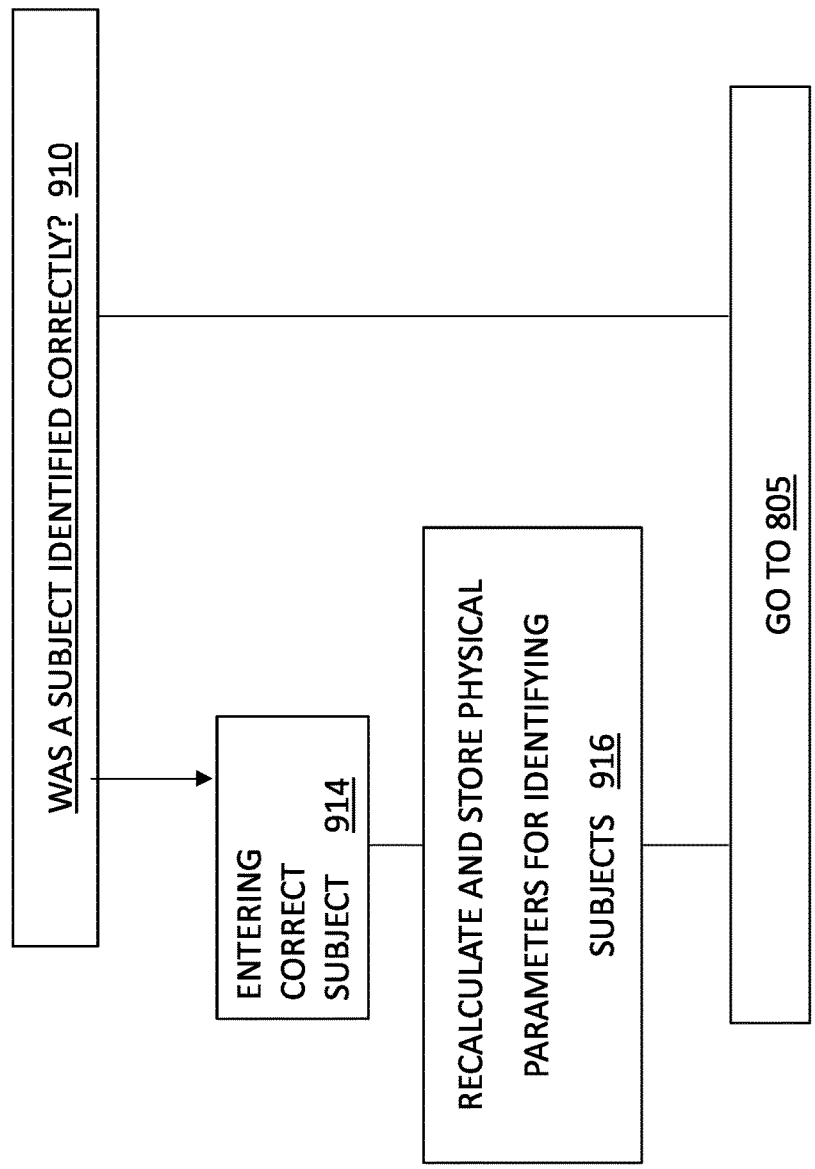
FIG. 13 schematically shows a method for learning to recognize a particular subject in block diagram form.

Referring now to FIG. 13, a method for learning to recognize a particular subject is shown in block diagram form. The act of learning from recognizing the subject to improve accuracy 804 includes determining whether the subject was identified correctly 910, if not, then entering the correct subject 914. Once the correct subject is identified than recalculating and storing physical parameters related to the physical sensors to better identify the subject on the next pass, 916. Then the algorithm continues by returning to step 805. For example, the identification of the individual recognized may be displayed to a person in the room or vehicle. If it is incorrect, the person may input the correct identification into the application as by activating a keyboard, button, icon or the like.

Figure 14:
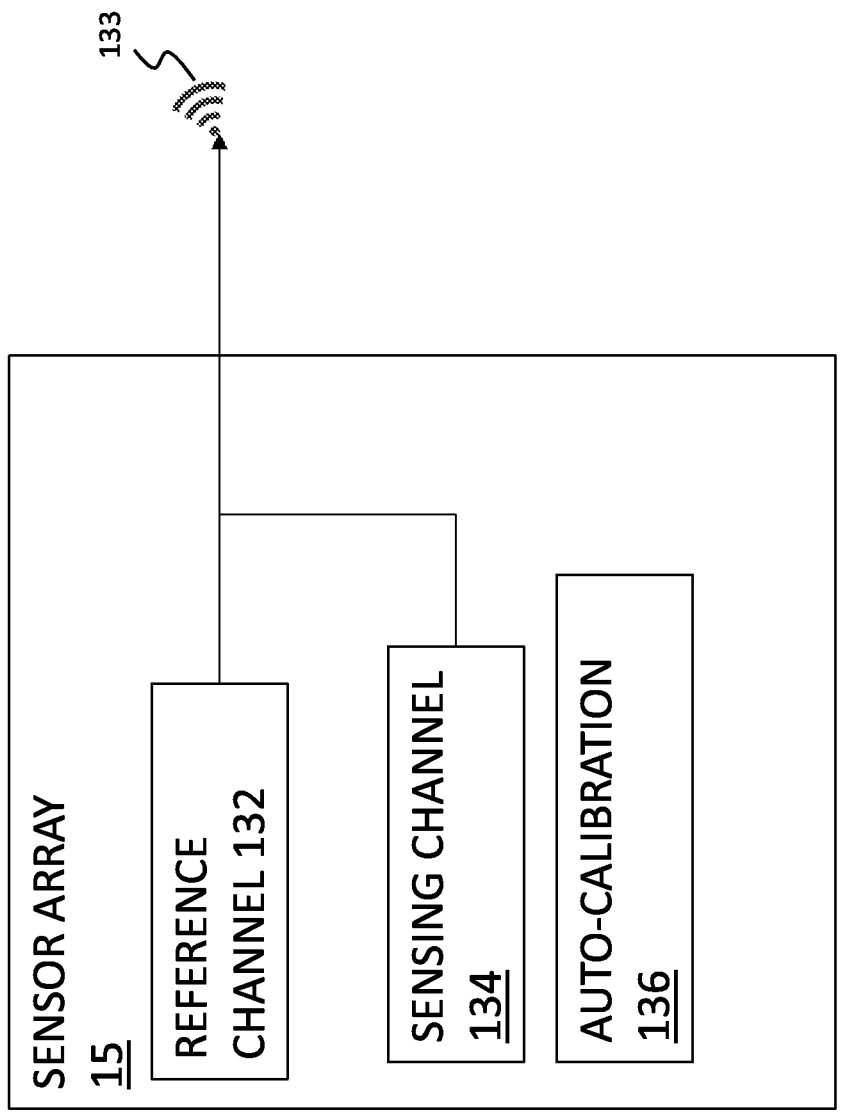
FIG. 14 shows a more detailed schematic of the sensor array.

Referring now to FIG. 14, a more detailed schematic of the sensor array is shown. In still another example, the at least one $CO_2$ sensor 15 mitigates drift by operating a reference channel 132, using a $CO_2$ non-absorbing wavelength, and a sensing channel using a $CO_2$ maximum absorbing wavelength, and signal 133 resulting from combining data signals of both channels.

In another example, the $CO_2$ sensor further comprises in-situ temperature measurement for corrections of $CO_2$ level readings, and an auto-calibration algorithm for accurate $CO_2$ readings over time.

Figure 15:
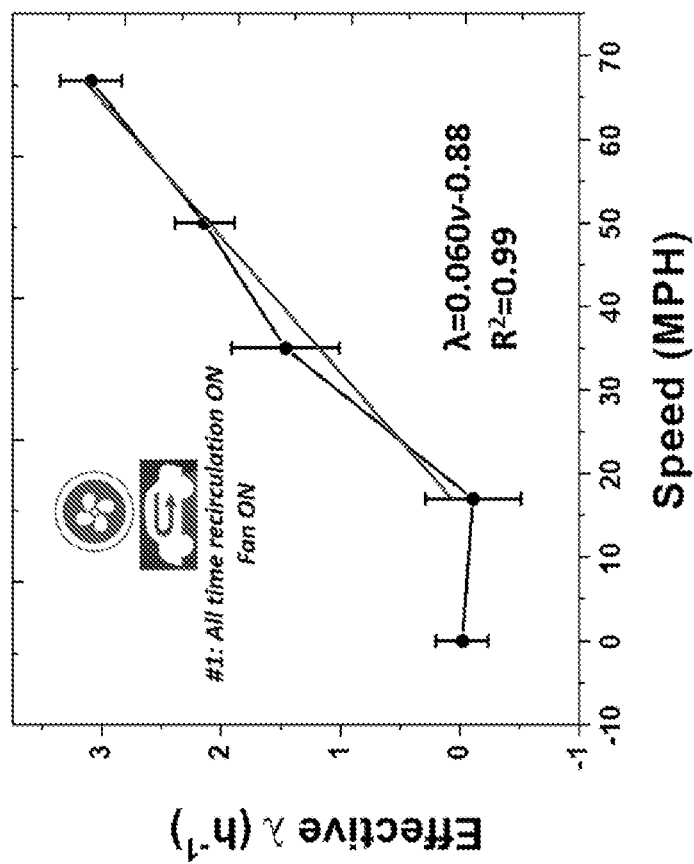
FIG. 15 shows the relationship between the effective air exchange rate (A) inside a car cabin assessed with a single occupant (driver) and driving speed in miles per hour (MPH).

Referring now to FIG. 15, the relationship between the effective air exchange rate (A) inside a car cabin assessed with a single occupant (driver) and driving speed in miles per hour (MPH) is shown. Eq. (7) and related ones were used to assess A. The line indicates linear regression curve above 17 MPH. The assessment of A was performed analyzing the carbon dioxide profiles obtained with the driver driving at different speeds, including parked conditions.

Figure 16:
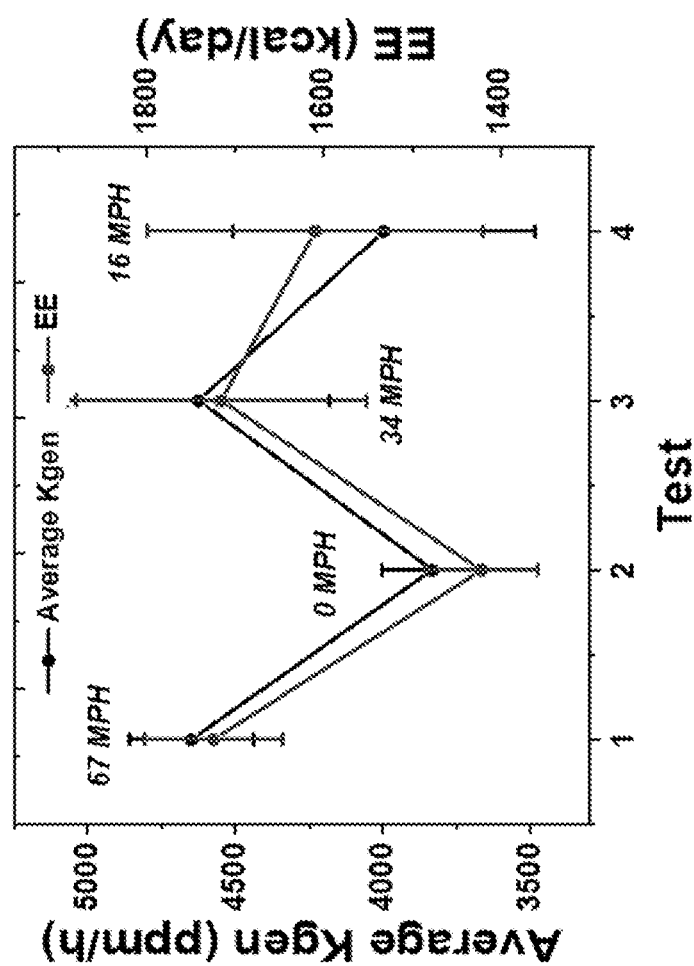
FIG. 16 shows the metabolic rate as EE (energy expenditure, kcal/day) on the right, and the model fitted $CO_2$ generation rate ($K_{gen}$) on the left.
Figure 17A:
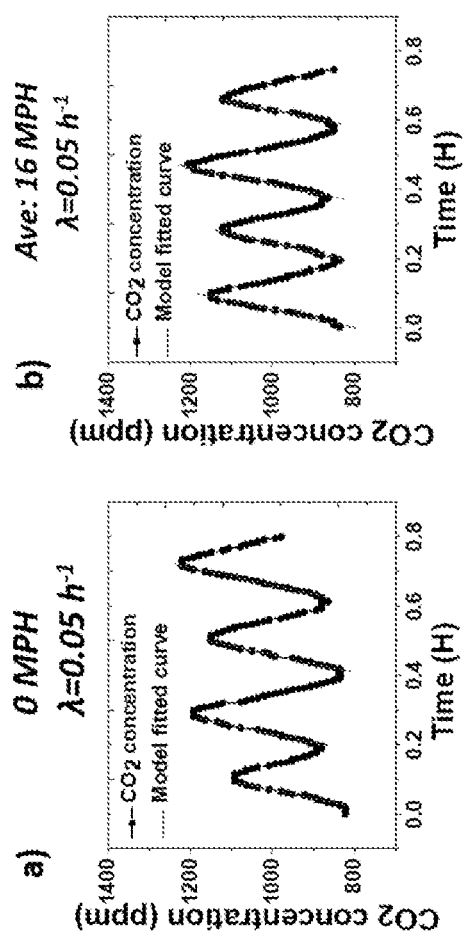
FIG. 17A-FIG. 17D show examples of real-time $CO_2$ concentration profile and the model fitted curves under different driving speeds.
Figure 17B:
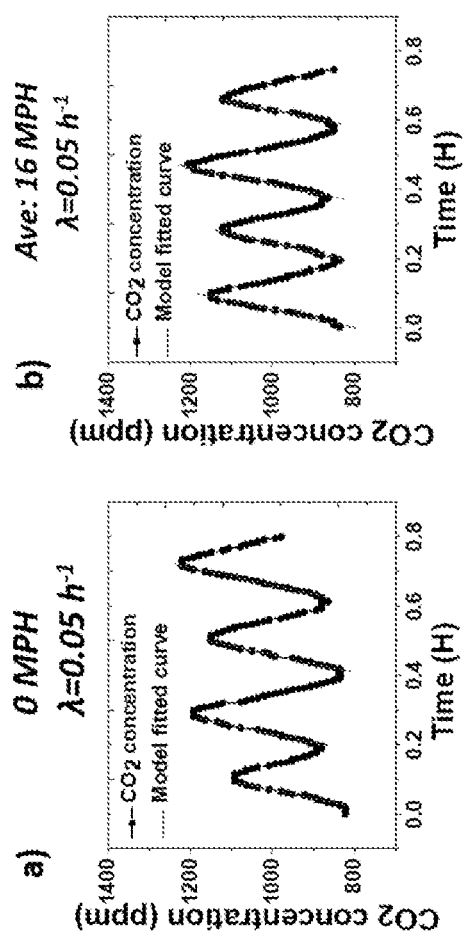
Figure 17C:
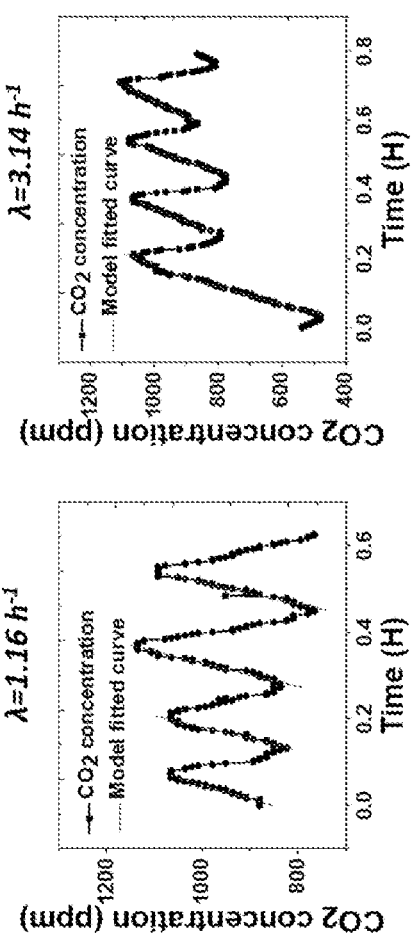
Figure 17D:
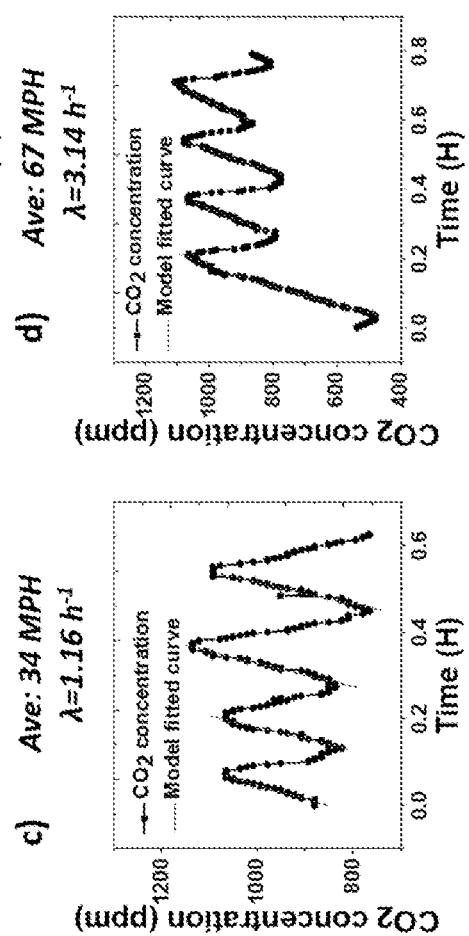

Referring now to FIG. 16, the metabolic rate as EE (energy expenditure, kcal/day) on the right, and the model fitted $CO_2$ generation rate ($K_{gen}$) on the left is shown. The data shown in FIG. 16 were extracted from the carbon dioxide patterns shown in FIG. 17A-FIG. 17D. S Still referring to FIG. 15 and FIG. 16, certain exemplary embodiments of the invention can be used inside a car or any other confined space. FIGS. 15 and 16 show examples of air exchange rate, and metabolic rate values assessed inside the car cabin with a single occupant (driver) at different speeds. Both car's air exchange rate and driver's metabolic rate can be assessed with this invention's system, model, and algorithms. As shown in FIG. 15, the system allowed to determine that the air exchange rate increases with the car speed. In addition, the metabolic rate values shown in FIG. 16 are accurate values representing the metabolic rate values assessed by independent methods (metabolic instrument) on the same individual (driver).

Referring now concurrently to FIG. 17A-FIG. 17D, real-time $CO_2$ concentration profile and the model fitted curves under different driving speed of a) 0 MPH; b) 16 MPH; c) 37 MPH; d) 64 MPH are shown respectively. The $CO_2$ concentration was kept under 1100 ppm by alternating recirculation mode on and off, and keeping the ventilation level of 1 (minimum ventilation energy consumption). These patterns were obtained under controlled alternating air recirculation and ventilated conditions, which enabled controlling air quality inside the car cabin. Since the ventilation conditions were maintained at $1^{st}$ (minimum) level, the ventilation energy was minimized.

Figures 18A, 18B, 18C:
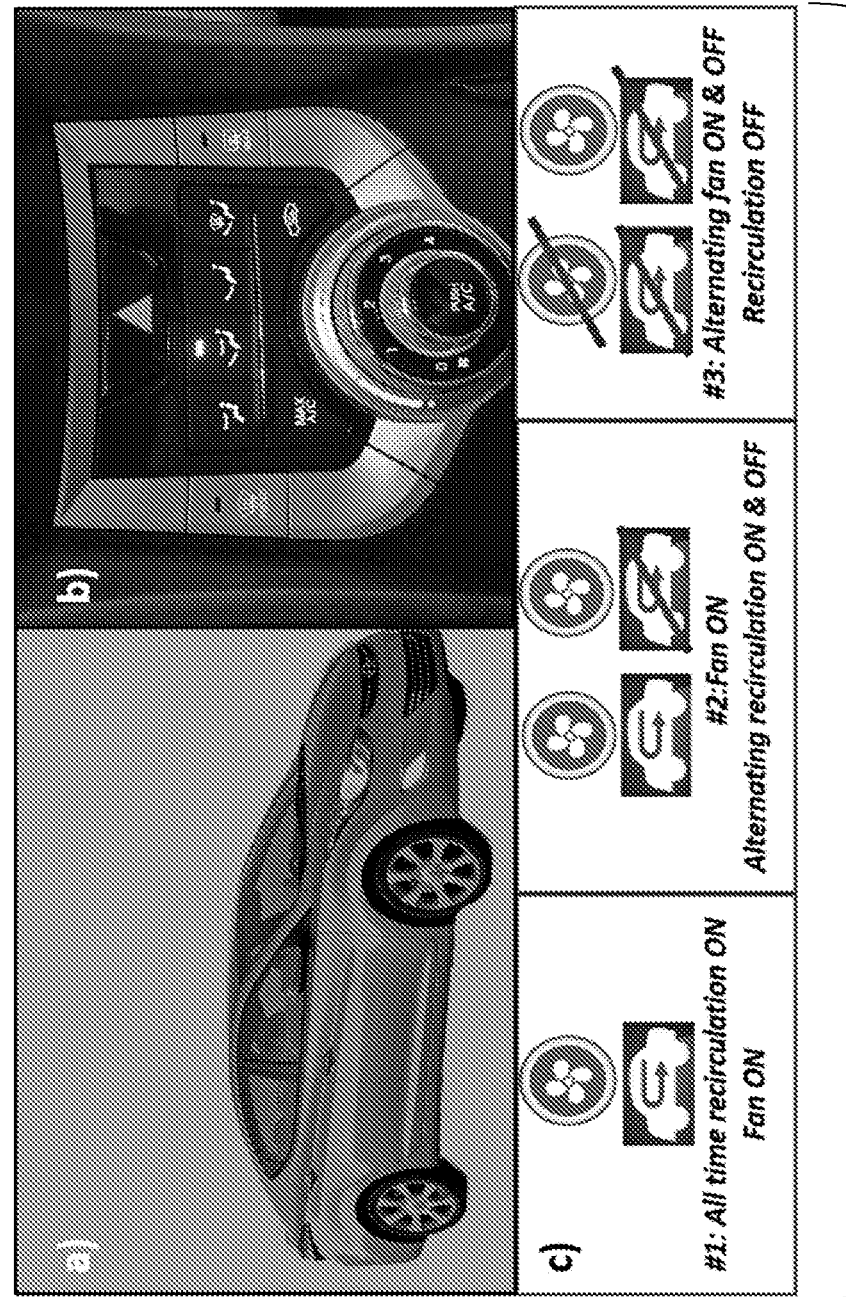
FIG. 18A shows an example of a vehicle used in assessment of data shown in FIG. 15 thru 17.
FIG. 18B shows an example of a vehicle AC control panel.
FIG. 18C shows examples of a vehicle's optional ventilation conditions.

Referring now jointly to FIG. 18A-FIG. 18B a vehicle used in assessment of data shown in FIG. 15 thru 17, an AC control panel of the car and different ventilation condition options of a vehicle are respectively shown. Referring specifically to FIG. 18C an example of car used for the tests shown in FIGS. 15-17, and summarizes the different car's ventilation modes are shown. The ventilation modes include: mode #1 air recirculation (ON) with no ventilation, mode #2 alternating air recirculation with ventilation, and mode #3 alternating ventilation, with no recirculation. For the sake of safe carbon dioxide exposure, ventilation energy minimization, and biometrics extraction, mode #2 is the mode of choice for the presently disclosed method.

Referring now to FIG. 19A-FIG. 19D, different ventilation conditions at speeds from zero MPH, 33 MPH, 49 MPH and 71 MPH are shown respectively. For example, FIG. 19A shows carbon dioxide concentration in parts per million (PPM) for a time period of 0 to 15 minutes for occupants from 1 through 5 AT ZERO MPH. Similarly, FIG. 19B, shows similar data for 33 MPH. Similarly, FIG. 19C, shows similar data for 49 MPH. Similarly, FIG. 19C, shows similar data for 49 MPH. Similarly, FIG. 19D, shows similar data for 71 MPH.

Figures 20A, 20B:
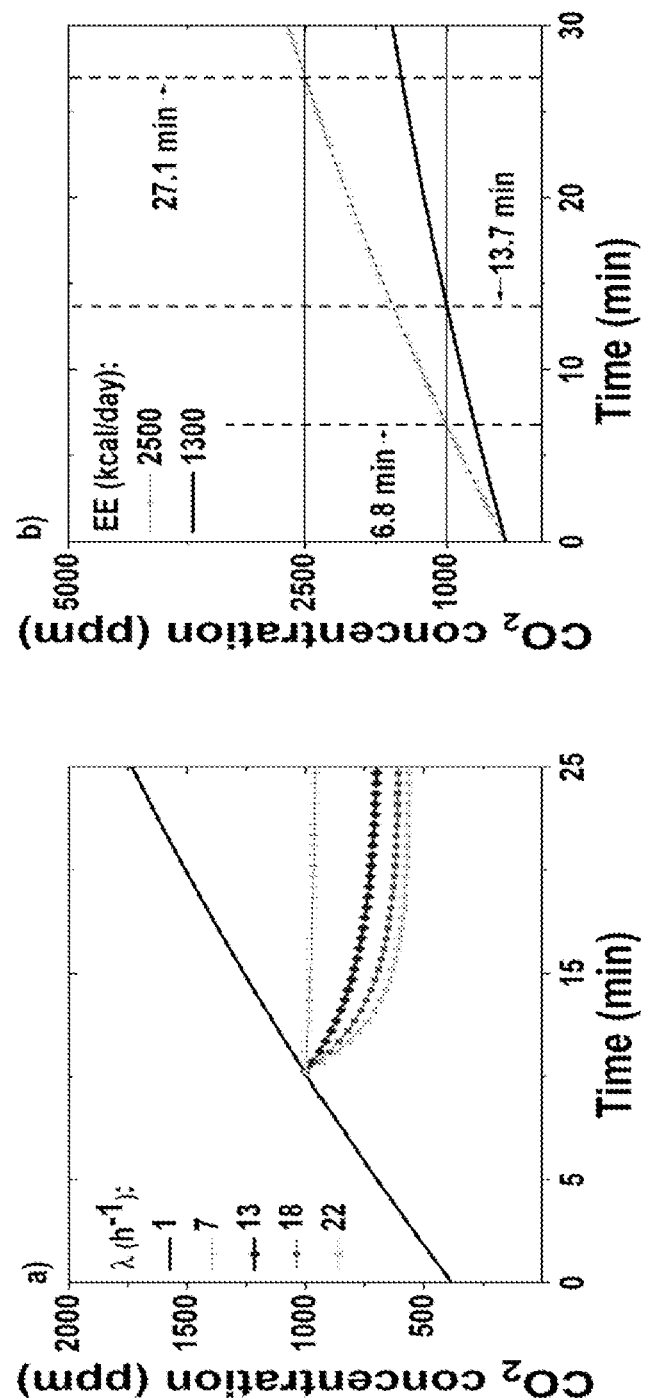
FIG. 20A shows how a $CO_2$ profile can be affected by changing the effective air exchange rate from 1 to a higher value, up to 22 $h^{-1}$, e.g. by alternating the recirculation (RC) mode on and off, and/or opening windows.
FIG. 20B demonstrates the effect of occupant metabolic rate on $CO_2$ accumulation within a vehicle.

Referring now to FIG. 20A and FIG. 20B, simulated $CO_2$ concentration growth profiles inside a car cabin (recirculation mode on) with different number of occupants under various speeds, and realistic air exchange rates (FIG. 15) are shown. In FIG. 20B a horizontal line has been drawn at both 1000 and 2500 ppm with a label to indicate the corresponding time at which a vehicle with a single occupant reaches the aforementioned $CO_2$ concentration. As mentioned previously, $CO_2$ accumulation at these levels can have effects on driver safety since at 1000 ppm a person's cognitive function begins to decline and the effect is more severe at 2500 ppm. The simulation predicts that $CO_2$ levels within the car cabin reaches 1000 ppm for a single occupant in 15 minutes with RC mode on, regardless of vehicle speed. The risk of $CO_2$ accumulation to dangerous levels is significantly higher for car cabins where there is more than 1 occupant; this is clearly evidenced in the simulation's output where $CO_2$ levels exceeding 2500 ppm are reached in under 15 minutes when the vehicle is occupied with at least 3 occupants, regardless of vehicle speed. This result highlights the importance of consistent $CO_2$ concentration control to ensure that indoor air quality is always maintained with respect to $CO_2$.

Referring now specifically to FIG. 20A, an example of how a $CO_2$ profile can be affected by changing the effective air exchange rate from 1 to a higher value, up to 22 $h^{-1}$, e.g. by alternating the recirculation (RC) mode on and off, and/or opening windows is shown. The effect of different fan levels (with corresponding λ values extrapolated from experimental data) were simulated using the aforementioned model. To keep the $CO_2$ concentration within a vehicle at a level that does not affect the driver's cognitive abilities, it is necessary to increase λ. At higher fan levels the $CO_2$ concentration decreases faster to safer levels.

Referring now specifically to FIG. 20B an example of the effect of occupant metabolic rate on $CO_2$ accumulation within a vehicle is demonstrated. Clearly, occupant metabolic rate has a substantial influence on the $CO_2$ concentration growth profile. A driver with a relatively high EE of 2500 kcal/day will reach a $CO_2$ concentration of 1000 ppm in just 6.8 minutes, as compared with virtually twice as long (13.7 min) for a driver spending only 1300 kcal/day. The high-EE driver can reach a $CO_2$ concentration of 2500 ppm in less than half an hour.

It is important to mention that the application of the present invention is very relevant to confined environments, small rooms and cabins in general such as those in offices, airplanes, cars, trucks, enclosed small vehicles, space shuttles. The accumulation of carbon dioxide over time can be significant in short periods of time compromising the cognitive performance of the individuals located inside the confined environments with limited air exchange. FIG. 19 shows a set of simulations performed with the model presented here, when there is no active actuation of air circulation, which promote carbon dioxide build up. It can be observed that even, when a vehicle such as the car, increases speed, increasing the air exchange rate; it takes only few minutes to reach dangerous carbon dioxide levels (higher than 1000 ppm) for an average person's metabolic rate (1300 kca/day). The use of the invention as proposed in this application would avoid such a problem, since it can actively control the ventilation to set back the carbon dioxide levels at a healthy stage (FIG. 20a). This is critically important since people with higher metabolic rate can reach critical exposure to unhealthy carbon dioxide concentrations in shorter periods of time (FIG. 20b). The capability of assessing metabolic rate, managing air exchange, and intelligently controlling air ventilation while minimizing energy are unique features of this disclosed invention.

Certain exemplary embodiments of the invention have been described herein in considerable detail in order to comply with the patent Statutes and to provide those skilled in the art with it the information needed to apply the novel principles of the present invention, and to construct and use such exemplary and specialized components as are required. However, it is to be understood that the invention may be carried out by different equipment, and devices, and that various modifications, both as to the equipment details and operating procedures, may be accomplished without departing from the true spirit and scope of the present invention.

REFERENCES

The teachings of the following publications are incorporated by this reference.

[1] W. D. McArdle, F. I. Katch, and V. L. Katch, *Exercise physiology: nutrition, energy, and human performance*: Lippincott Williams & Wilkins, 2010.

[2] M. M. Manore, N. L. Meyer, and J. Thompson, "Sport Nutrition for Health and Performance," *Human Kinetics* (Ed.), vol. Second Edition, 2009.

[3] H. L. A. S. Mifflin St Jeor, B. J, Daugherty S. A, Koh Y. O., "A new predictive equation for resting energy expenditure in healthy individuals," *Am J Clin Nutr.*, vol. 51, 1990.

[4] a) S. B. Deng Y., St Jeor S., "Comparison of Resting Metabolic Rates Between Predictive Equations and Portable Indirect calorimeter," *The Obesity Society*, 2017.

b) Bonomi, G., Tiemann, C. A., Chen, W., Determining Metabolic Parameters WO 2017/006204 A1

[5] D. C. Nieman, G. Y. Trone, and M. D. Austin, "A new handheld device for measuring resting metabolic rate and oxygen consumption," *Journal Of The American Dietetic Association*, vol. 103, pp. 588-593, May 2003.

[6] X. Xian, A. Quach, D. Bridgeman, F. Tsow, E. Forzani, and N. Tao, "Personalized indirect calorimeter for energy expenditure (EE) measurement," *Global Journal of Obesity, Diabetes and Metabolic Syndrome*, vol. 2, pp. 004-008, 2015.

[7] M. L. Neuhouser, L. Tinker, P. A. Shaw, D. Schoeller, S. A. Bingham, L. Van Horn, et al., "Use of recovery biomarkers to calibrate nutrient consumption self-reports in the Women's Health Initiative," *American Journal Of Epidemiology*, vol. 167, pp. 1247-1259, May 15 2008.

[8] J. Esparza, C. Fox, I. T. Harper, P. H. Bennett, L. O. Schulz, M. E. Valencia, et al., "Daily energy expenditure in Mexican and USA Pima Indians: low physical activity as a possible cause of obesity," *International Journal Of Obesity*, vol. 24, pp. 55-59, January 2000.

[9] D. D. Shao, C. B. Liu, F. Tsow, Y. T. Yang, Z. J. Du, R. Iriya, et al., "Noncontact Monitoring of Blood Oxygen Saturation Using Camera and Dual-Wavelength Imaging System," *Ieee Transactions on Biomedical Engineering*, vol. 63, pp. 1091-1098, June 2016.

[10] D. D. Shao, Y. T. Yang, C. B. Liu, F. Tsow, H. Yu, and N. J. Tao, "Noncontact Monitoring Breathing Pattern, Exhalation Flow Rate and Pulse Transit Time," *Ieee Transactions on Biomedical Engineering*, vol. 61, pp. 2760-2767, November 2014.

[11] a) M. G. Apte, W. J. Fisk, and J. M. Daisey, "Associations Between Indoor CO2 Concentrations and Sick Building Syndrome Symptoms in U.S. Office Buildings: An Analysis of the 1994-1996 BASE Study Data," *Indoor Air*, vol. 10, pp. 246-257, 2000.

b) Satish U, Mendell M J, Shekhar K, Hotchi T, Sullivan D P, Streufert S, Fisk W J. 2012. Is CO2 an indoor pollutant? Direct effects of low-to-moderate CO2 concentrations on human decision-making performance. *Environ. Health Perspect.* 120(12):1671-1677 c) Maddalena R, Mendell M J, Eliseeva K, Chan W R, Sullivan D P, Russell M, Satish U, Fisk W J. 2015. Effects of ventilation rate per person and per floor area on perceived air quality, sick building syndrome symptoms, and decision-making. *Indoor Air* 25: 362-370 d) Allen J G, MacNaughton P, Satish U, Santanam S, Vallarino J, Spengler J D. 2016. Associations of cognitive function scores with carbon dioxide, ventilation, and volatile organic compound exposures in office workers: A controlled exposure study of green and conventional office environments. *Environ. Health Perspect.* 124:805-812.

[12] X. Zhang, P. Wargocki, Z. Lian, and C. Thyregod, "Effects of exposure to carbon dioxide and bioeffluents on perceived air quality, self-assessed acute health symptoms, and cognitive performance," *Indoor Air*, vol. 27, pp. 47-64, 2017.

[13] P. C. Moore, D.; McMurrough, K.; Mesrobian, J.; Bauer, J., "Salt Creek Phases III/IV Environmental Assessment," *Bureau of Land Management: BLM-Casper Field Office*, 2006.

[14] T. Godish, *Sick Buildings: Definition, Diagnosis, and Mitigation*, 1 ed ed.: CRC Press Company: United States of America, 1994.

[15] R. Pitarma, G. Marques, and B. R. Ferreira, "Monitoring Indoor Air Quality for Enhanced Occupational Health," *Journal of Medical Systems*, vol. 41, p. 23, Dec. 20 2016.

[16] T.-V. Dinh, I.-Y. Choi, Y.-S. Son, and J.-C. Kim, "A review on non-dispersive infrared gas sensors: Improvement of sensor detection limit and interference correction," *Sensors and Actuators B: Chemical*, vol. 231, pp. 529-538, 2016/08/01/2016.

[17] M. G. Shrestha S., Klaasen C., "Product Testing Report Wall-Mounted $CO_2$ Humidity Transmitters," *Iowa State University: Ankeny, Iowa,* 2008.

[18] G. Sensing, "Telaire 7001 CO2 and Temperature Monitor User InstructionsTelaire 7001 CO2 and Temperature Monitor User Instructions. Onset Computer Corporation: Billerica, Mass.," 2006.

[19] E. A. S. Bouhamra W. S., Abdul-Raheem M. Y., "Predicted and measured air exchange rates," *Ashrae Journal-American Society of Heating Refrigerating and Air-Conditioning Engineers*, vol. 40, pp. 42-45, 1998.

[20] E. R., "Measuring Air Changes per Hour with Carbon Dioxide. Imperial College London: London, U.K.," ed.

[21] J. Atkinson, Y. Chartier, C. L. P. Silvia, P. Jensen, Y. Li, and W. H. Seto, *Natural ventilation for infection control in health-care settings*: World Health Organization, 2009.

[22] J. B. D. Weir, "New Methods For Calculating Metabolic Rate With Special Reference To Protein Metabolism," *Journal Of Physiology—London*, vol. 109, pp. 1-9, 1949.

[23] J. B. D. Weir, "Nutrition Metabolism Classic—New Methods For Calculating Metabolic-Rate With Special Reference To Protein-Metabolism," *Nutrition*, vol. 6, pp. 213-221, May-June 1990.

[24] S. N. Stapel, H.-J. S. de Grooth, H. Alimohamad, P. W. Elbers, A. R. Girbes, P. J. Weijs, et al., "Ventilator-derived carbon dioxide production to assess energy expenditure in critically ill patients: proof of concept," *Critical Care*, vol. 19, p. 370, 2015.

[25] A. Persily and L. de Jonge, "Carbon dioxide generation rates for building occupants," *Indoor Air*, vol. 27, pp. 868-879, 2017.

[26] V. Jones, "Resting Metabolic Rate: A Critical, Primary Care Screening Test," *MedGenMed*, accessed via http://www.ncbi.nlm.nih.gov/pmc/, vol. 8, p. 76, 2006.

[27] J. Speakman and C. Selman, "Physical activity and resting metabolic rate," *Proceedings of the Nutrition Society*, vol. 62, pp. 621-634, 2003.

[28] M. H. Sherman, "Tracer-gas techniques for measuring ventilation in a single zone," *Building and Environment*, vol. 25, pp. 365-374, 1990/01/01/1990.

[29] P. Weissler. (2017) CO2 buildup in vehicle cabins becoming a safety issue. 2. Available: http://articles.sae.org/15377/

[30] K. Gladyszewska-Fiedoruk, "Concentrations of carbon dioxide in the cabin of a small passenger car," *Transportation Research Part D: Transport and Environment*, vol. 16, pp. 327-331, 2011/06/01/2011.

What is claimed is:

1. An integrated method for assessing metabolic rate and maintaining indoor air quality comprising:
   a) assessing room occupancy with at least one physical sensor;
   b) setting an actuated ventilation system to a constant $CO_2$ level in a predetermined healthy range, where the actuated ventilation system includes at least one $CO_2$ sensor;
   c) operating the actuated ventilation system to set a first air ventilation rate;
   d) operating the at least one $CO_2$ sensor to measure a first measured $CO_2$ level;
   e) determining if the first measured $CO_2$ level is in a predetermined healthy range, if not then further actuating the actuated ventilation system to set a second air ventilation rate to drive an adjusted $CO_2$ level into the predetermined healthy range;
   f) operating the at least one $CO_2$ sensor to measure the adjusted $CO_2$ level; and
   g) operating the actuated ventilation system to determine if the adjusted $CO_2$ level is at the predetermined healthy range and if it is then determining the setting of change of air ventilation rate ($\alpha ACH$), otherwise repeating acts f)-g);
   h) assessing air change rate; and
   i) operating a processor to provide, based on a difference between the adjusted $CO_2$ level and the first measured $CO_2$ level, an assessment of overall metabolic rate for multiple users or an individual assessment of an individual's metabolic rate for a single user.

2. The method of claim 1 further including the act of recognizing a particular subject by operating a physical sensor.

3. The method of claim 2 wherein the physical sensor is selected from the group consisting of a weight sensor, a biometric sensor and combinations thereof.

4. The method of claim 2 further including the act of learning from recognizing the subject to improve accuracy.

5. The method of claim 1 wherein at least one $CO_2$ sensor that mitigates drift by operating a reference channel, using a $CO_2$ non-absorbing wavelength, and a sensing channel using at least one $CO_2$ absorbing wavelength, and signal resulting from the combination of both channels.

6. The method of claim 5 wherein the at least one $CO_2$ sensor further comprises an in-situ temperature measurement sensor for corrections of $CO_2$ level readings, and an auto-calibration algorithm for accurate $CO_2$ readings over time.

7. The method of claim 1 wherein the predetermined healthy range of $CO_2$ level is a set of values within 600-1000 ppm to enhance the air quality and the ventilation system energy use.

8. The method of claim 1 wherein the assessing of air change rate comprises assessing air change rate by a $CO_2$ decay model or by an augmenting physical pressure based model.

9. An integrated system for assessing metabolic rate and maintaining indoor air quality in an indoor space, the system comprising:
   at least one physical sensor;
   an actuated ventilation system adapted to be set to a predetermined healthy range of $CO_2$ level, where the actuated ventilation system includes at least one $CO_2$ sensor;
   where the actuated ventilation system includes a set of conditions with pre-assessed and adaptable air ventilation rates (ACH), the actuated ventilation system is set to a first air ventilation rate (ACH1 providing a first $CO_2$ value sensed by the at least one $CO_2$ sensor and being in a predetermined healthy range, and the actuated ventilation system is configured to change to a second air ventilation rate (ACH2) providing a sensed $CO_2$ value sensed by the at least one $CO_2$ sensor that is equal to the first $CO_2$ value to keep a constant $CO_2$ level; and
   a processor programmed for determining an assessment of change of air ventilation rate ($\alpha ACH$) as a difference between ACH1 and ACH2, and outputting a metabolic rate for one or more individuals present in the indoor space.

10. The system of claim 9, wherein the processor is further programmed for recognizing a particular subject by operating the at least one physical sensor.

11. The system of claim 10 wherein the physical sensor is selected from the group consisting of a weight sensor, a biometric sensor and combinations thereof.

12. The system of claim 9 wherein the at least one $CO_2$ sensor further comprises a reference channel, using a $CO_2$ non-absorbing wavelength, and a sensing channel using a $CO_2$ absorbing wavelength, and a combined signal resulting from both channels.

13. The system of claim 12 wherein the at least one $CO_2$ sensor further comprises an in-situ temperature measurement sensor for corrections of $CO_2$ level readings, and an auto-calibration algorithm for accurate $CO_2$ readings over time.

14. The system of claim 9 wherein the predetermined healthy range of $CO_2$ level is a set of values within 600-1000 ppm to enhance the ventilation system energy use.

15. An integrated method for assessing metabolic rate and maintaining indoor air quality comprising:
   a) assessing room occupancy with at least one physical sensor and recognizing a particular subject by operating a physical sensor;
   b) setting an actuated ventilation system to a constant $CO_2$ level in a predetermined healthy range, where the actuated ventilation system includes at least one $CO_2$ sensor;

c) operating the actuated ventilation system to set a first air ventilation rate (ACH1);

d) operating the at least one $CO_2$ sensor to measure a first $CO_2$ level, wherein the at least one $CO_2$ sensor mitigates drift by operating a reference channel, using a $CO_2$ non-absorbing wavelength, and a sensing channel using an IR wavelength, and signal resulting from the combination of both channels;

e) operating the actuated ventilation system to determine if the $CO_2$ level is a set value within a predetermined healthy range of 600-1000 ppm, if not then further actuating the actuated ventilation system set a second air ventilation rate (ACH2) to drive the $CO_2$ level into the predetermined healthy range;

f) operating the at least one $CO_2$ sensor to measure a second $CO_2$ level; and g) operating the actuated ventilation system to determine if the $CO_2$ level is at the predetermined healthy range and if it is then determining an assessment of change of air ventilation rate ($\alpha$ACH), otherwise repeating acts f)-g);

h) assessing air change rate; and i) outputting an assessment of overall metabolic rate for multiple users or outputting an individual assessment of metabolic rate for a single user, based on a difference between the first $CO_2$ level and the second $CO_2$ level.

16. The method of claim 15 wherein the physical sensor is selected from the group consisting of a weight sensor, a biometric sensor and combinations thereof.

17. The method of claim 16 further including the act of learning from recognizing the particular subject to improve accuracy of the assessment of overall metabolic rate for the multiple users or of the assessment of metabolic rate for the single user.

18. The method of claim 16 wherein the at least one $CO_2$ sensor further comprises in-situ temperature measurement sensor for correcting $CO_2$ level readings, and automatically calibrating for accurate $CO_2$ readings over time.

19. The method of claim 15 wherein the assessing of air change rate comprises assessing air change rate by a $CO_2$ decay model or by an augmenting physical pressure based model.

* * * * *